(12) United States Patent
Brailovskiy

(10) Patent No.: US 7,191,525 B2
(45) Date of Patent: Mar. 20, 2007

(54) TWO-STAGE ATTACHMENT FOR CUTTING, CRIMPING ETC, AND MECHANICAL METHOD THEREOF

(76) Inventor: Aleksandr M. Brailovskiy, 613 Magnolia Rd., Lumberton, MS (US) 39455

( * ) Notice: Subject to any disclaimer, the term of this patent is extended or adjusted under 35 U.S.C. 154(b) by 54 days.

(21) Appl. No.: 10/961,608

(22) Filed: Oct. 8, 2004

(65) Prior Publication Data

US 2005/0076513 A1    Apr. 14, 2005

Related U.S. Application Data

(60) Provisional application No. 60/510,166, filed on Oct. 8, 2003.

(51) Int. Cl.
*B26B 17/02*    (2006.01)
(52) U.S. Cl. .................. 30/189; 30/180; 30/181; 72/409.1; 72/452.7
(58) Field of Classification Search .......... 30/176, 30/180, 186, 187, 191, 192, 252, 92, 175, 30/181, 183, 189; 72/409.01, 409.12, 409.09, 72/452.7
See application file for complete search history.

(56) References Cited

U.S. PATENT DOCUMENTS

| | | | | |
|---|---|---|---|---|
| 157,610 | A * | 12/1874 | King | 30/192 |
| 596,066 | A * | 12/1897 | Helwig | 30/180 |
| 710,182 | A * | 9/1902 | Carolus | 30/176 |
| 812,225 | A * | 2/1906 | Painter | 7/133 |
| 2,319,558 | A * | 5/1943 | Romanoff | 30/189 |
| 2,330,009 | A * | 9/1943 | Romanoff | 30/189 |
| 2,647,312 | A * | 8/1953 | Neal | 30/189 |
| 3,913,227 | A * | 10/1975 | Shurtleff | 30/181 |
| 4,130,938 | A * | 12/1978 | Uhlmann | 30/192 |
| 4,144,738 | A * | 3/1979 | Dziura et al. | 72/409.08 |
| 4,353,240 | A * | 10/1982 | Undin et al. | 72/409.12 |
| 4,571,975 | A * | 2/1986 | Pawloski et al. | 72/325 |
| 4,587,732 | A | 5/1986 | Lind et al. | |
| 4,760,644 | A | 8/1988 | Yirmiyahu et al. | |
| 5,245,755 | A * | 9/1993 | Krivec | 30/189 |
| 5,862,597 | A | 1/1999 | Juros | |
| 5,898,998 | A | 5/1999 | Deville | |
| 6,185,825 | B1 | 2/2001 | Olson | |
| 6,226,874 | B1 | 5/2001 | Jansson | |
| 6,230,542 | B1 | 5/2001 | Frenken | |
| 6,807,961 | B2 * | 10/2004 | Burrows | 125/23.01 |

FOREIGN PATENT DOCUMENTS

| | | |
|---|---|---|
| DE | 3402544 | 8/1985 |
| EP | 0011545 | 5/1980 |
| JP | 02001179530 A | 7/2001 |
| JP | 02002078988 A | 3/2002 |
| WO | WO 9505271 | 2/1995 |

OTHER PUBLICATIONS

O.M. Slesarev et al, "Diving Craftsmanship." "Igreck" St. Petersburg, Russia, ISBN 5-85849-0328, 1996.

* cited by examiner

*Primary Examiner*—Hwei-Siu Payer
(74) *Attorney, Agent, or Firm*—Bardmesser Law Group

(57) ABSTRACT

A two-stage attachment includes two stages of levers arranged to apply a cutting, shearing, squeezing and/or piercing force. The first stage includes a cam lever that has a segmented arcuate pushing surface. The second stage includes a blades support that has an arcuate yielding surface. The pushing surface contacts the yielding surface such that force applied to the cam lever is transmitted to the blade support through the contact between the surfaces.

18 Claims, 16 Drawing Sheets

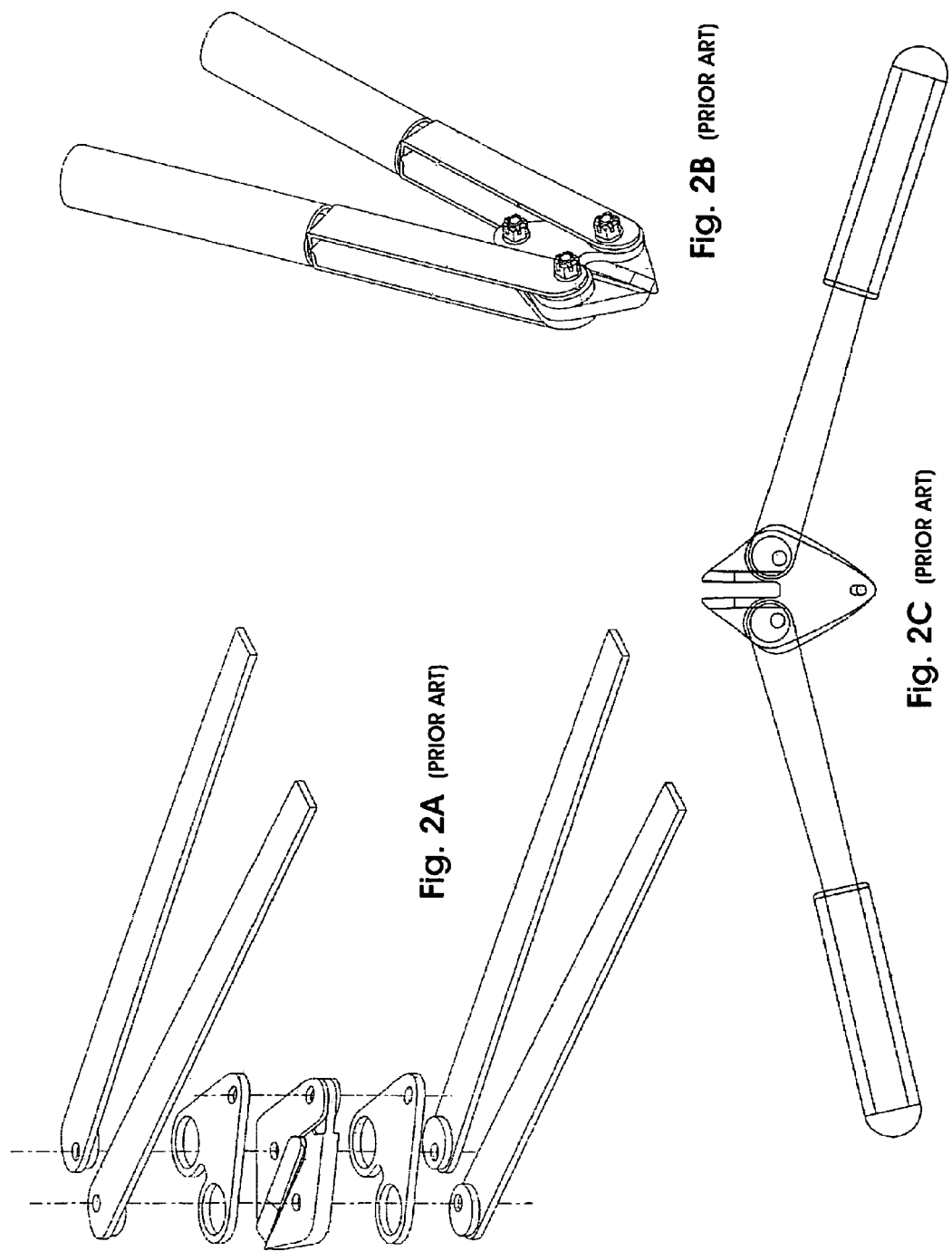

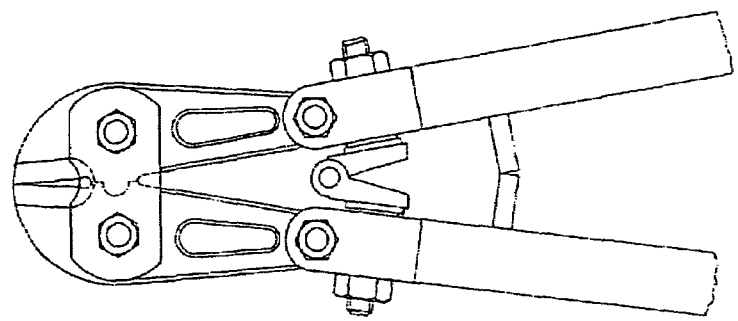
Fig. 4C (PRIOR ART)
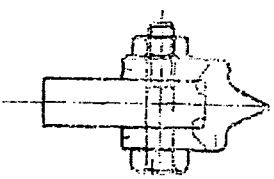
Fig. 4A (PRIOR ART)
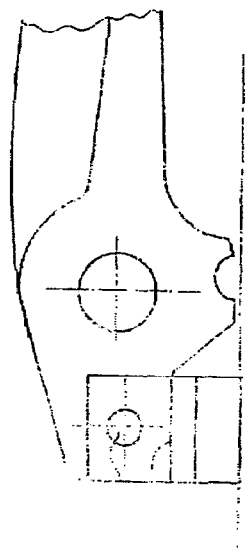
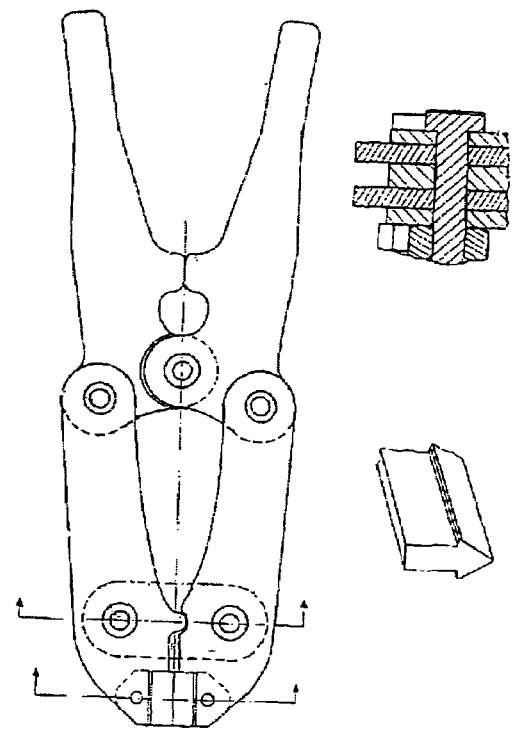
Fig. 4B (PRIOR ART)

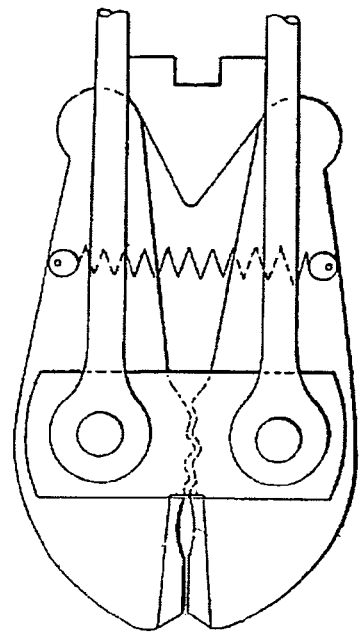
Fig. 5A (PRIOR ART)
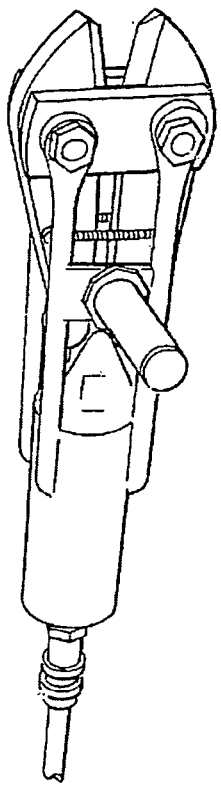
Fig. 5B (PRIOR ART)
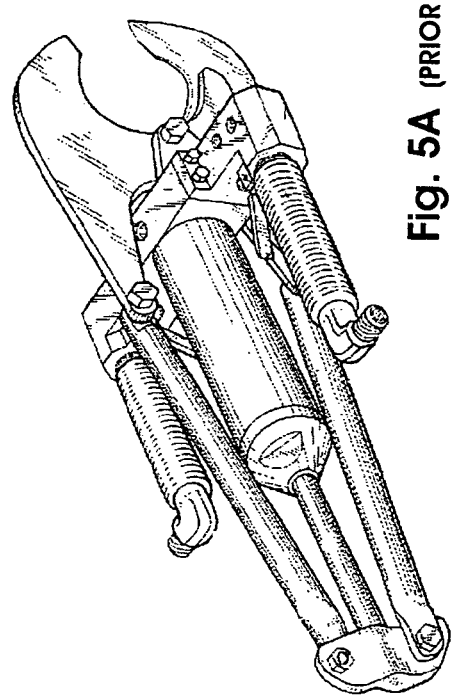
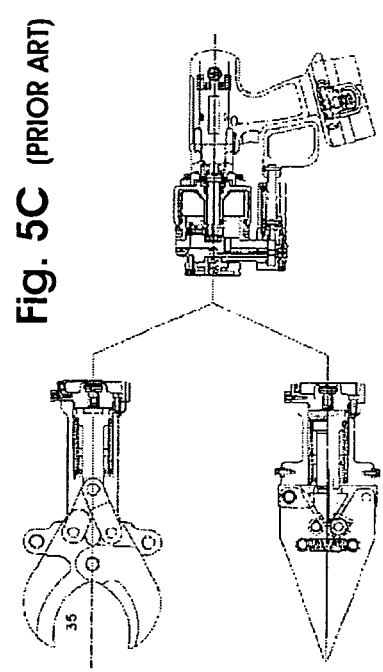
Fig. 5C (PRIOR ART)

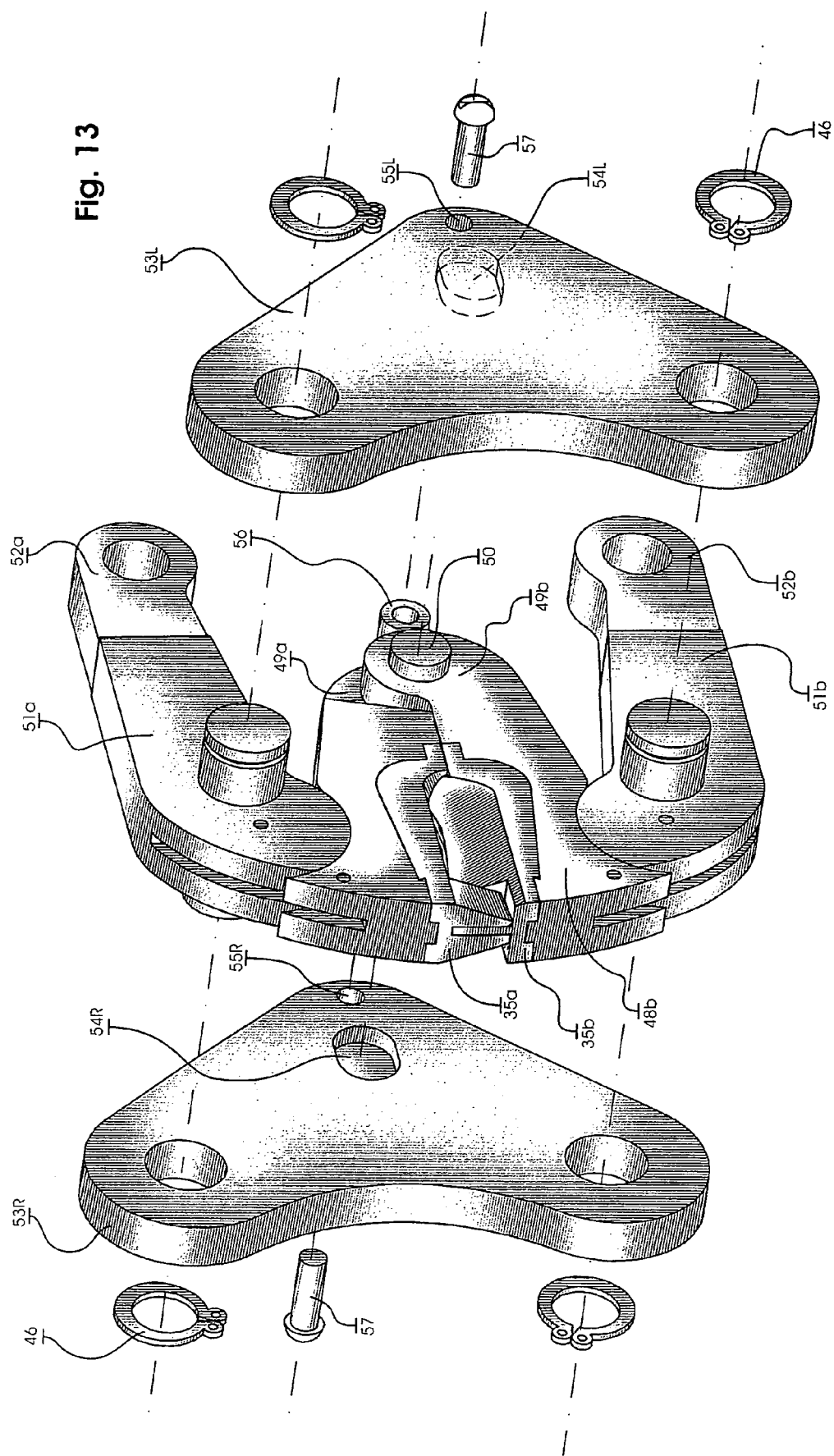

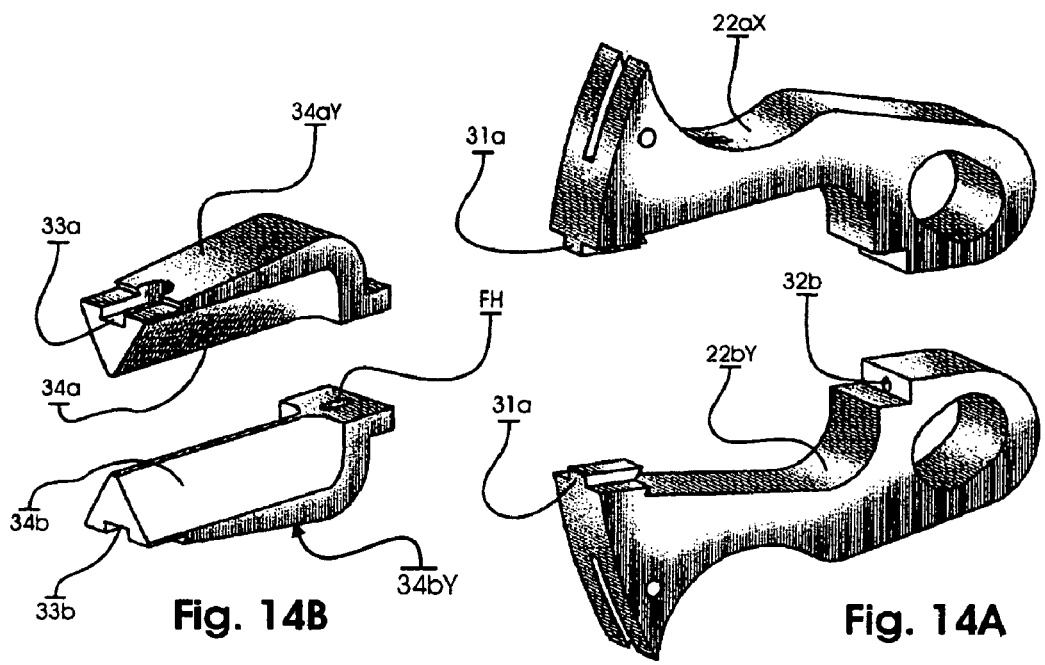
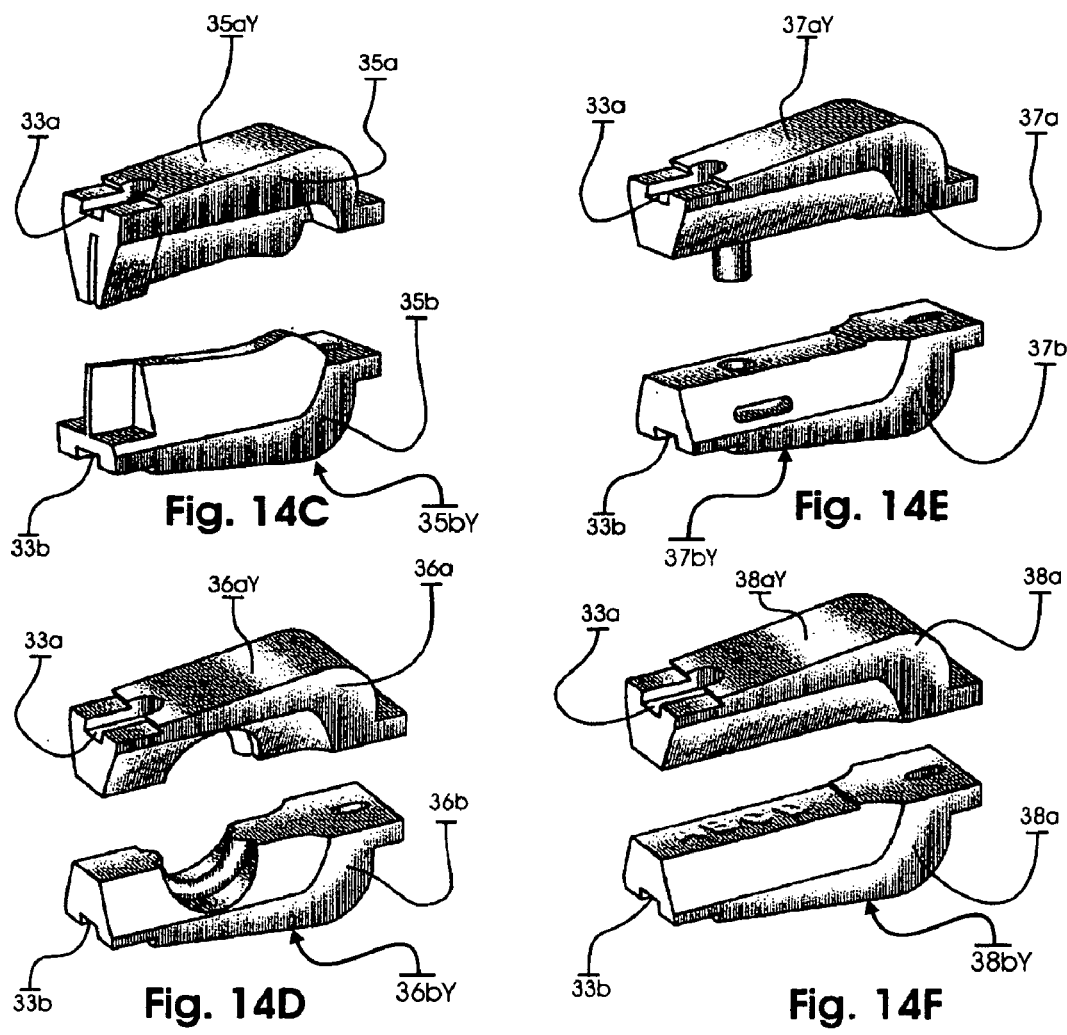

TWO-STAGE ATTACHMENT FOR CUTTING, CRIMPING ETC, AND MECHANICAL METHOD THEREOF

CROSS-REFERENCE TO RELATED APPLICATIONS

This application claims priority to U.S. Provisional Patent Application No. 60/510,166, filed on Oct. 8, 2003, entitled TWO-STAGE ATTACHMENT FOR CUTTING, CRIMPING ETC, AND MECHANICAL METHOD THEREOF, which is incorporated herein by reference in its entirety.

BACKGROUND OF THE INVENTION

This invention is related to tools and, more particularly, to tools for performing operations requiring an application of a severing or squeezing force, such as cutting or crimping metal rods, bolts and cables.

Many tools in this field are limited to one specific function. Thus, a user must acquire and maintain a large amount of hardware in the course of doing business. In addition, most tools designed for a particular task do not provide any versatility, even for that particular task.

Many tools have been designed to provide additional versatility, but many of those tools have sacrificed some of the qualities inherent in single-purpose tools. For instance, in the past, if a user desired to cut metal rods or bolts and cut cables, they were required to purchase two separate tools (i.e., one for cutting metal rods or bolts and another for cutting cables). Two tools were required because well-known bolt cutters with straight edge jaws perform very poorly on cables.

One tool designed to cut both rods and cables is disclosed in U.S. Pat. No. 6,185,825 to Olson. As well as making an attempt to solve the problem described above, Olson attempted to bring the cutting action very close to a common pivot point of two cutting blades, while substantially reducing the size of the blades (see FIGS. 1A and 1B). However, the tool requires highly specialized hardware for sharpening the blades and it is critical to maintain the sharpness of the blades for cutting cable. Blades have a tendency to wear out with use. If the cutting edges wear out or dull even slightly and are used to cut cable, they tend to shear through a portion of the cable's thickness and then "chew" on the cable between the blades. Plus, after only a few sharpening cycles, the entire tool must be discarded because there is no provision for replaceable blades. Furthermore, the tool uses blades configured to shear that are enclosed inside one another, which requires the tool to have a width exceeding that of squeezing or crushing type cutters and limits to the tool's usefulness.

U.S. Pat. No. 5,862,597 to Juros (see FIGS. 2A–2C), discloses a tool that makes it possible to bring the cutting action as close to a point of applied force as physically allowable, but doing so comes at a cost. Considering structural properties of the materials involved, the width of the tool must exceed that of most conventional cutters, thus restricting its use in narrow openings, such as between pipe flange faces. The tool employs fully circular eccentrically pivoted bosses to increase the mechanical advantage, and as a result, the tool's handles must be opened to a notably greater angle. For all practical purposes the increased angle nullifies the benefit of the handles being shorter, and makes them unsafe and uncomfortable to use. Additionally, the tool does not provide for inexpensive and easily replaceable blades.

Devices described in WO Publication No. 9505271 to Cooper (see FIG. 3A), U.S. Pat. No. 6,226,874 to Jansson (see FIG. 3B) and conventional, widely sold bolt cutters (see FIG. 3C), along with many others featuring a similar configuration, present another well-known approach to the subject of the cutter's longevity. In particular, they provide various means for adjusting the blades after their sharpening. Nevertheless, eventually one still has to replace blades that cost nearly as much as an entire new tool.

The issue of replaceable blades was addressed by EP0011545 to Muller (see FIG. 4A) and U.S. Pat. No. 5,898,998 to Deville (see FIG. 4B), but the solution suggested therein, while being suitable for use in many tool designs, is not entirely satisfactory. First, the design weakens the blade support. The design also does not facilitate a uniform transfer and distribution of tension within the metal structures of the blade and blade support, which accelerates fatigue of the structures.

All four of latter inventions suffer from an obvious departure from keeping the cutting action near the point of applied force, so these tools, once again, demand an application of greater force to their handles.

An illustrative example of loss of versatility in favor of improving a narrow aspect can be seen in German Patent No. 3402544 to Hoffmann (see FIG. 4C). It completely eliminates slippage of a material that is being cut away from the point of applied force. In exchange, this improvement renders the cutter practically incapable of cutting anything thinner than the distance between the jaws when they are opened to about two-thirds of their capacity.

Tools that feature power sources are, for purposes of the present discussion, represented by disclosures of U.S. Pat. No. 4,587,732 to Lind et al. (see FIG. 5A), U.S. Pat. No. 4,760,644 to Yirmiyahu et al. (see FIG. 5B) and JP 02002078988 to Oide (see FIG. 5C). These tools can readily utilize a variety of attachments for different operations. But such attachments come at relatively high cost, and, except for JP 02002078988, it is doubtful that they are easily demountable. Also, these inventions solve practically none of the other shortcomings discussed above.

Operations falling into a category of "cutting" had been discussed thus far. This was done in an attempt to make it clear that a challenge of finding an optimal combination of most efficient means for accomplishing even slightly varying tasks remains unanswered by the conventional art.

With the exception of U.S. Pat. No. 6,185,825 to Olson (see FIGS. 1A–1B) and U.S. Pat. No. 5,862,597 to Juros (see FIGS. 2A–2C), whose tools utilize one stage lever action, other previously discussed manual cutters use handles as levers of a first stage, and blades as levers of a second stage.

The present invention introduces not only such combination, but also a far greater degree of versatility while sacrificing very few or none of the other benefits that elements of the combination provide individually.

SUMMARY OF THE INVENTION

The present invention is directed to a two-stage attachment for cutting and crimping and a method for same that substantially obviates one or more of the problems and disadvantages of the related art.

In accordance with the purpose of the present invention, as embodied and broadly described, there is provided a two-stage attachment that includes a fulcrum plate, a pair of cam levers, and a pair of blade supports. The pair of cam levers are pivotally connected to the fulcrum plate by a pair of master pivots. Each of the cam levers includes a segmented arcuate pushing surface on a side that faces the other cam lever. The blade supports are located between the pair of cam levers and are pivotally coupled to each other and the fulcrum plate by a slave pivot. Each blade support includes an arcuate yielding surface and a blade. Each of the blade supports is located adjacent to a respective cam lever such that the pushing surface and the yielding surface are in intimate sliding contact and blade is located on a side of the blade support that is opposite from the cam lever.

In another embodiment, a two-stage attachment includes a fulcrum plate, a pair of cam levers, and a pair of blade supports. The cam levers are pivotally connected to the fulcrum plate by a pair of master pivots. Each of the pair of cam levers includes a segmented arcuate pushing surface on a side facing the other cam lever. Each of the blade supports is independently pivotally coupled to the fulcrum plate by a slave pivot and includes a yielding surface and a blade. Each of the blade supports is also located adjacent to a respective cam lever such that the pushing surface and the yielding surface contact each other.

In another embodiment, a two-stage attachment includes a fulcrum plate, a cam lever and a blade support. The cam lever is pivotally connected to the fulcrum plate by a master pivot and includes a segmented arcuate pushing surface. The blade support is pivotally coupled to the fulcrum plate by a slave pivot and includes an arcuate yielding surface and a blade. The blade support is located adjacent to the cam lever such that the pushing surface and the yielding surface are in intimate sliding contact and the cam lever and the blade support are located in a common plane.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings:

FIGS. 2A, 2B and 2C show an exploded isometric view, an isometric view and a plan view, respectively, of a conventional device of U.S. Pat. No. 5,862,597.

FIGS. 4A, 4B and 4C show views of an exchangeable blade of a conventional device of EP0011545, a plan view of a conventional device of U.S. Pat. No. 5,898,998 and a plan view of a conventional device of DE3402544, respectively.

FIGS. 5A, 5B and 5C show an isometric view of a conventional device of U.S. Pat. No. 4,587,732, an isometric view of a conventional device of U.S. Pat. No. 4,760,644 and a plan view of a conventional device of JP 02002078988, respectively.

FIG. 13 shows a partially exploded isometric view of a manually operated version of two-stage attachment, with movable members shown in the same fashion as in FIG. 8.

FIGS. 14A to 14F show, in the following order, pair of blade supports (FIG. 14A) and sets of exchangeable blades for crushing (FIG. 14B), shearing (FIG. 14C), crimping (FIG. 14D), perforating (FIG. 14E) and labeling, or imprinting of characters (FIG. 14F).

DETAILED DESCRIPTION OF THE PREFERRED EMBODIMENTS

Figure 1A:
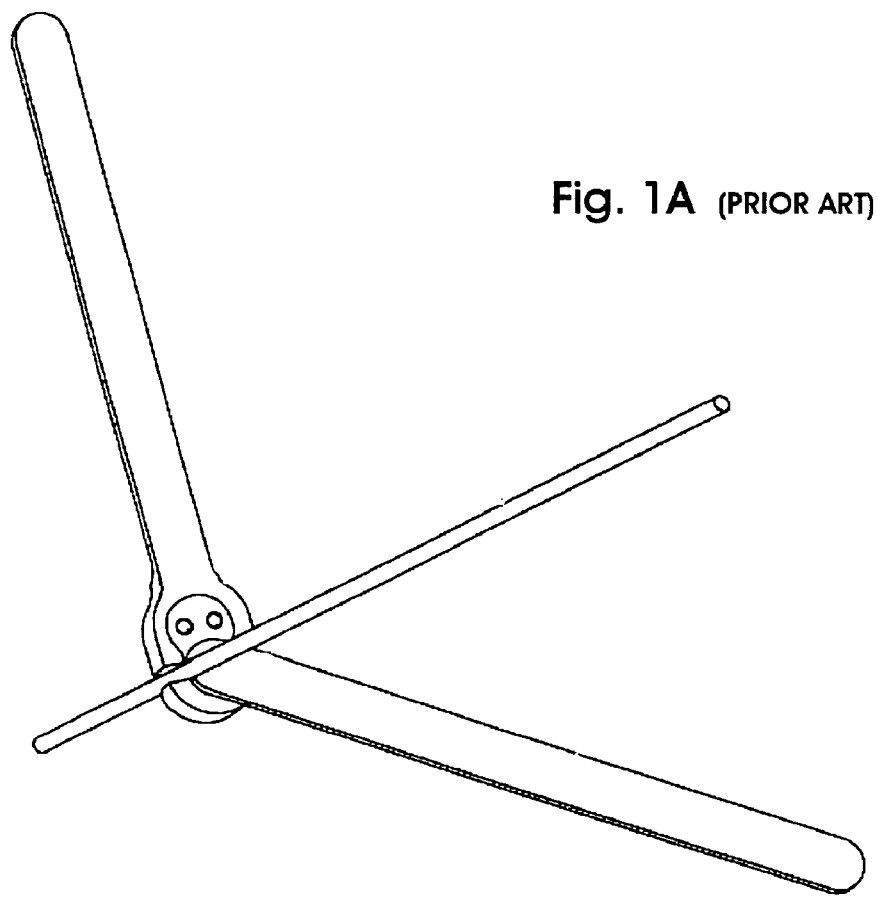
FIGS. 1A and 1B show an isometric view and an exploded isometric view of a conventional device of U.S. Pat. No. 6,185,825.
Figure 1B:
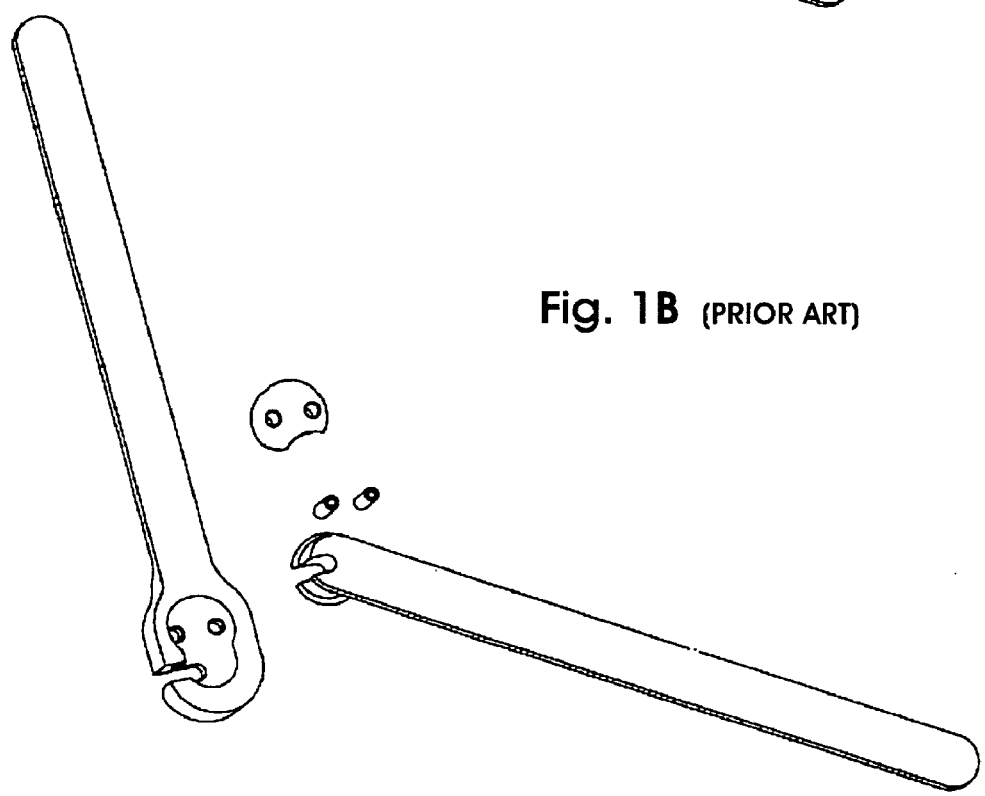
Figure 3C:
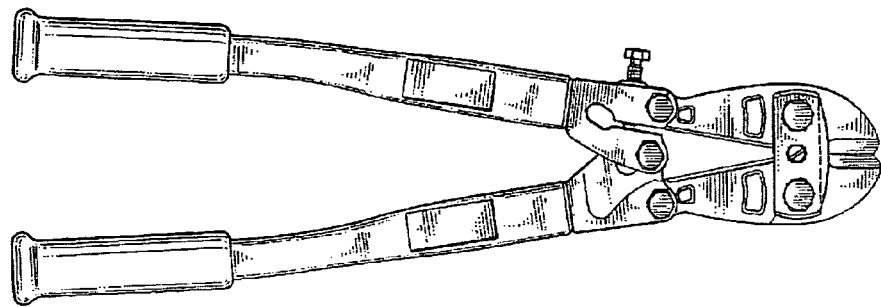
FIGS. 3A, 3B and 3C show a plan view of a conventional device of WO9505271, a plan view of a conventional device of U.S. Pat. No. 6,226,874 and a plan view of a commercially available bolt cutter, respectively.
Figure 3A:
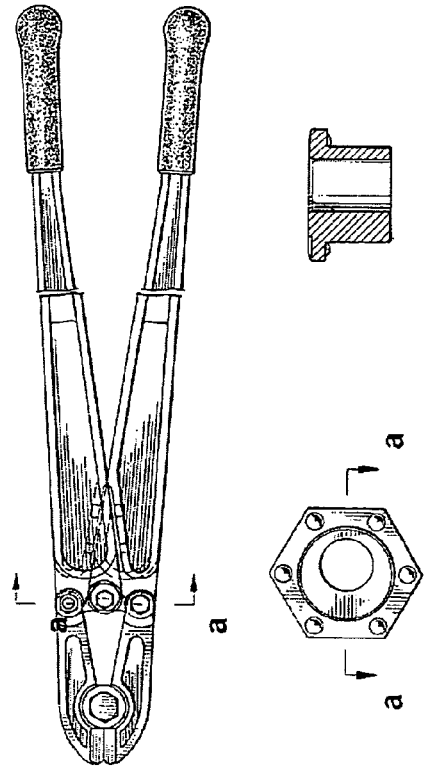
Figure 3B:
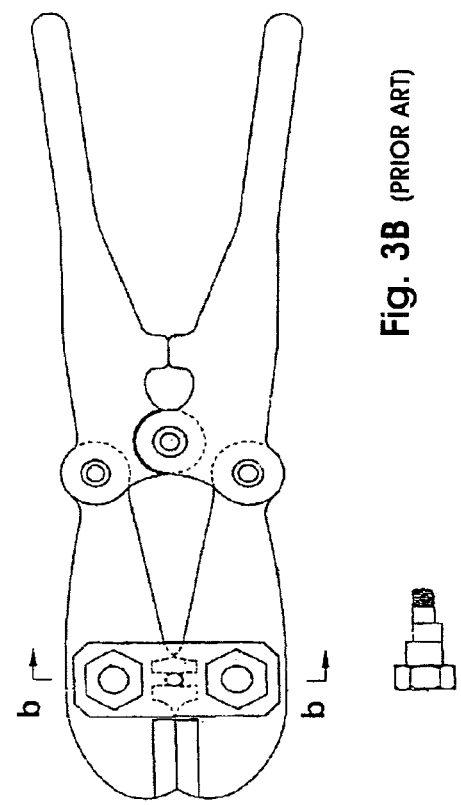

Reference will now be made in detail to the preferred embodiments of the present invention, examples of which are illustrated in the accompanying drawings.

The present invention, in a broad sense, is a two-stage lever arrangement designed to provide a compact device with an improved mechanical advantage to apply a cutting, shearing, squeezing and/or piercing force. The device can be configured for manual or powered operation.

A segmented eccentrically pivoted cam, as opposed to fully circular or elliptical cam, is used as a part of a lever of a first stage. A working surface of the cam imparts a force to a working surface of another pivoted member, or a blade support, which thus effectively becomes a lever of a second stage. The present invention arranges for two-stage lever action to occur within the same spatial dimensions as those allowing for merely one-stage lever action in conventional tools.

Means for linking each cam lever to the respective blade support may be provided in a manner such that the link does not obstruct the movement of the cam lever and the blade support relative to each other. When a means for linking the cam lever to the respective blade support is not provided, the contact between working surfaces is maintained by springs that can be of any number of shapes and located in various suitable places.

The blade support is capable of accommodating a variety of interchangeable blades designed for various tasks. The present invention can therefore incorporate several functions into one multifunctional tool.

A device according to one embodiment of the present invention provides various features and advantages. First, a segmented eccentrically pivoted cam, combined as a single piece with a lever of a first stage, imparts force to a separately pivoted second stage blade support. Such a configuration allows the two stages to be arranged within the same or smaller spatial dimensions than the one-stage lever action of conventional devices. In addition, functionality is added by introducing exchangeable blades. The blades are mounted in such a manner that bending, twisting, stretching and other tensions resulting from deforming a work piece are transmitted uniformly and distributed evenly between the blade and the blade support.

The features and advantages of the present invention are described more comprehensively below. Both conventional devices and the present invention make use of eccentrically pivoted cams in order to multiply forces. However, the cams of conventional devices are fully circumferential, making them excessively space- and material-consuming, and in most cases capable of serving only a very narrow purpose. The force multiplying element of the present invention is partially circumferential, or segmental. As shall be evident from the description below and the figures, such a design provides a great deal of flexibility in designing multifunctional tools and machinery.

Another aspect is with regard to exchangeable blades, and in particular, the way the blades are mounted, and the resulting ability to vary their shapes and functions. Such a mounting method puts a theoretical axis of connection of the blade to the blade support at certain angle to a theoretical axis of the attachment. A single small retaining screw suffices to keep each blade in place.

The present invention introduces an attachment that is readily adaptable to force multiplying devices, both manual and those using a power source.

Other advantages of the present invention include:

1) Making the attachment multifunctional and long-lasting by creating several sets of blades, that are detachable and exchangeable, whereby each set is designed for its own specific function, namely:
   a) cutting bolts, rods and the like in a squeezing/crushing manner,
   b) cutting bolts, rods and like in a shearing manner,
   c) cutting cables and steel wire ropes,
   d) crimping hose end fittings and cable end connectors,
   e) perforating, i.e., punching holes through sheet metal, so that fastening of two or more sheet metal work pieces can take place,
   f) cutting concentric rings for making small washers, gaskets and O-rings,
   g) grommet installation onto edges of various stiff materials, and
   h) permanent labeling, i.e., imprinting characters onto metal for marking and/or sealing commenced by authorized persons.

2) Making an overall size of the attachment in all three of its cutting modes (a, b and c), crimping mode (d), perforating mode (e) and labeling/sealing mode (h) the same as, or smaller than, most conventional cutters, so that it:
   a) fits just as well or better into various small openings and gaps without changing its width (in other words, "open" position versus "closed" position), and
   b) avoids requiring longer handles and greater opening angles while operating as a manual tool.

3) Achieving a substantial reduction, compared to most conventional tools, of a force needed to perform the cut or the squeeze by making the cutting action occur as close to the point of applied force as possible.

4) Doing away with the slipping of the work piece in the beginning of the cut by optimizing the angle between the jaws in "open" position without any functional or dimensional sacrifice whatsoever.

5) Optimizing the distribution of the structural tensions that occur in an area of conjunction of the exchangeable blade and the blade support, thus preventing an uneven buildup of metal fatigue and an unsafe condition arising thereby.

6) Accomplishing a higher degree of adaptability than is available from the conventional tools, i.e., making the attachment suitable for use with any number of the force multiplying devices, both manual and those using power source, even those made by competing manufacturers, so that one can purchase the attachment and readily use it with, for example, old bolt cutter handles.

REFERENCE NUMERALS USED IN THE FIGS. 6–14F $15a$, $15b$-cams,
$15a$X, $15b$X—pushing surfaces,
$16a$, $16b$-levers,
$16$Ra, $16$La—pad eyes,
$16$H—spring holders,
$17a$, $17b$-master pivots,
$17$Ra, $17$La—master pivot shafts,
$18a$, $18b$-rollers,
$19a$, $19b$-roller's axes,
$20$—retaining screws,
$21a$, $21b$-cam levers,
$22a$, $22b$-blade supports,
$22a$X, $22b$X—yielding surfaces,
$22a$Y, $22b$Y—blade beds,
$23a$, $23b$-slave pivots,
$24a$, $24b$-apertures,
$25a$, $25b$-master pin orifices,
$26a$, $26b$-slave pin orifices,
$27a$, $27b$-cam slots,
$28a$, $28b$-blade support slots,
$29a$, $29b$-master pins,
$29aa$, $29bb$—slave pins,
$30a$, $30b$-linking springs,
$31a$, $31b$-keyed retaining ledges,
$32a$, $32b$-threaded holes,
$33a$, $33b$-grooved retaining shelves,
$34a$, $34b$-crushing blades,
$34a$Y—mounting surface,
$35a$Y—mounting surface,
$36a$Y—mounting surface,
$37a$Y—mounting surface,
$38a$Y—mounting surface,
$35a$, $35b$-shearing blades,
$36a$, $36b$-crimping blades,
$37a$, $37b$-perforating blades,
$38a$, $38b$-labeling blades, 39a, 39b—mounting screws,
40R, 40L—fulcrum plates,
41Ra, 41Rb—master pivot holes,
42Ra, 42Rb—slave pivot wells,
43Ra, 43Rb—mounting shaft wells,
44a, 44b—mounting shafts,
45—fasteners,
46—retaining rings,
47—actuating cam
CTA—cam theoretical area
PATA—prior art theoretical area
SR, SL—positioning springs,
FH—fastening holes,
FF—face flange,
MP—mounting pad eyes
48a, 48b—jointly pivoted blade supports,
49a, 49b—horizontally offset pad eyes,
50—common slave pivot,
51a, 51b—manually actuated cam levers,
52a, 52b—single pad eyes,
53R, 53L—lesser fulcrum plates,
54R, 54L—pivot grooves,
55R, 55L—fastener holes,
56—threaded spacer,
57—short fasteners.

Figure 7:
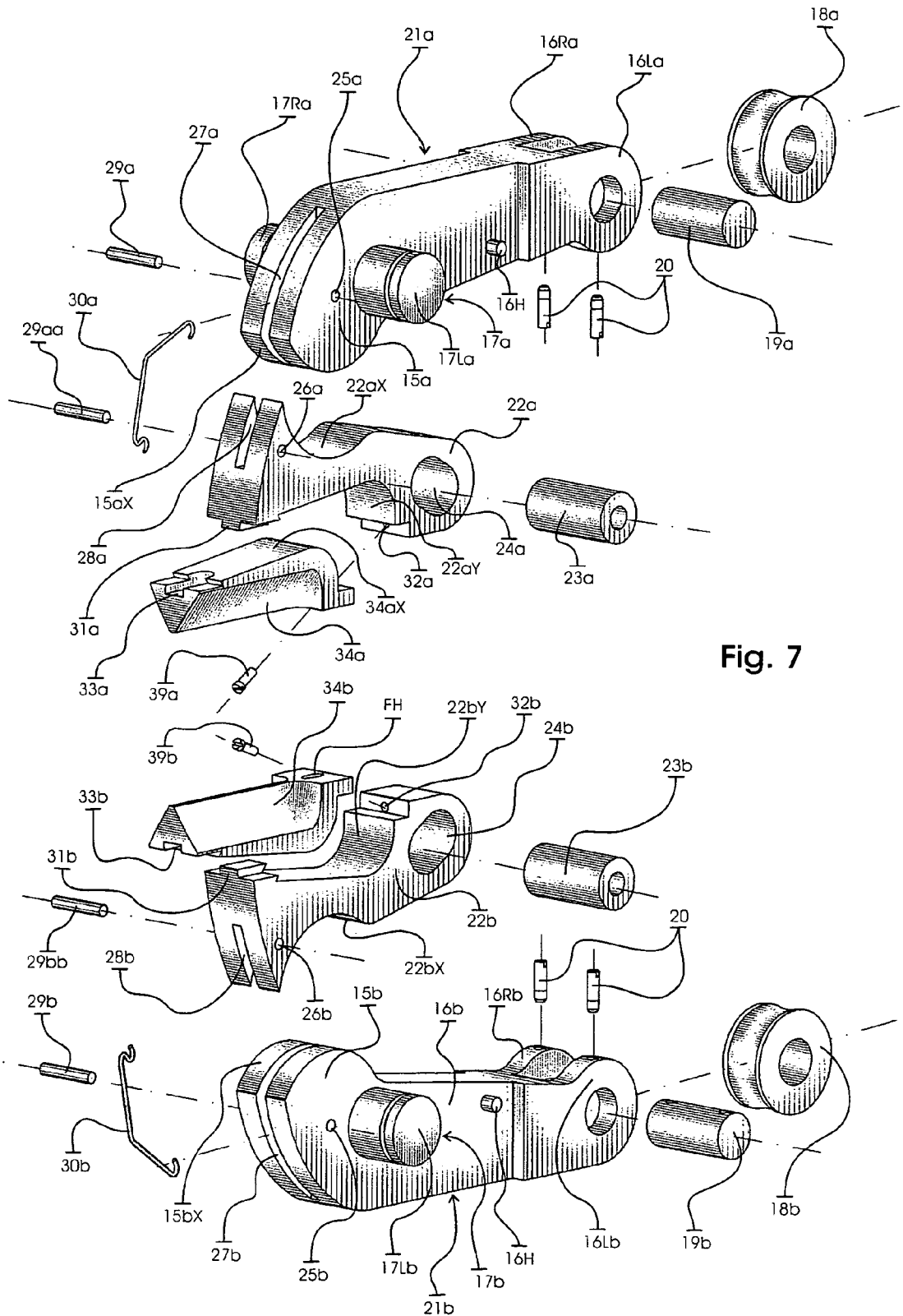
FIG. 7 shows exploded isometric views of movable members of a preferred embodiment of the two-stage attachment.

A preferred embodiment of a two-stage attachment, as shown in FIG. 7, includes, from top to bottom: upper cam lever, upper blade support, upper exchangeable blade, lower exchangeable blade (crushing blades shown), lower blade support and lower cam lever. The preferred embodiment includes two segmented cams 15a, 15b, as opposed to fully circular or elliptical, eccentrically pivoted cams. Each of the cams 15a, 15b is made as a single piece with its respective lever, namely levers 16a, 16b, so that each cam 15a, 15b and its lever 16a, 16b have one common pivot, or master pivot 17a, 17b. Each of two master pivots 17a and 17b, in turn, includes right and left master pivot shafts, 17Ra, 17La, 17Rb and 17Lb, respectively Rear ends of each of levers 16a, 16b fork into two coaxial vertically oriented pad eyes, shown as 16Ra, 16La, 16Rb and 16Lb. Rollers 18a, 18b are accommodated between the pad eyes 16Ra, 16La, 16Rb, 16Lb. Outer rim surfaces of each of rollers 18a, 18b have shallow grooves of triangular profile. Roller axles 19a, 19b, respectively, are inserted through pad eyes 16Ra, 16La, 16Rb, 16Lb and kept in place by retaining screws 20.

On both sides of levers 16a, 16b, in an area neighboring master pivot shafts 17Ra, 17La, 17Rb, 17Lb, spring holders 16H are arranged in order to retain ends of positioning springs SL (shown in FIG. 8) and SR (not shown). Spring SR corresponds to spring SL but is located on the opposite side of levers 16a, 16b.

The parts described above combine to form two cam levers 21a, 21b, as shown in FIG. 7. Master pivot shafts 17Ra, 17La, 17Rb, 17Lb are also made as a piece of cam levers 21a, 21b for the purpose of providing a necessary tensile strength of the cam levers 21a, 21b. Each cam lever 21a, 21b is able to rotate around its respective master pivot axis.

Cam levers 21a, 21b are designed for receiving a force, through rollers 18a, 18b, that causes them to rotate about their master pivots 17a, 17b. Such a force can be applied by different means, including, but not limited to, variously shaped actuating cams such as, for example, actuating cam 47 shown in FIGS. 10A–10B, which may be extended and retracted by hydraulic, electric or combined power actuators, ratchet-type devices (not shown), or any other actuator known to a person having ordinary skill in the relevant art Cams 15a, 15b include working surfaces, or pushing surfaces 15aX, 15bX, having a convex arcuate shape. These surfaces are centered with relation to master pivots 17a, 17b, and located on the outer edges of cams 15a, 15b. In the preferred embodiment, cam levers 21a, 21b are located such that they are symmetrically opposed to one another at a predetermined distance, with pushing surfaces 15aX, 15bX facing each other.

The two cam levers 21a, 21b, arranged as described above, form the first of two stages. A second stage of an attachment according to the present invention is formed by two individually pivoted blade supports 22a, 22b, also symmetrically facing one another and located between the cams 15a, 15b of the cam levers 21a, 21b, as shown in FIG. 7.

Figure 9A:
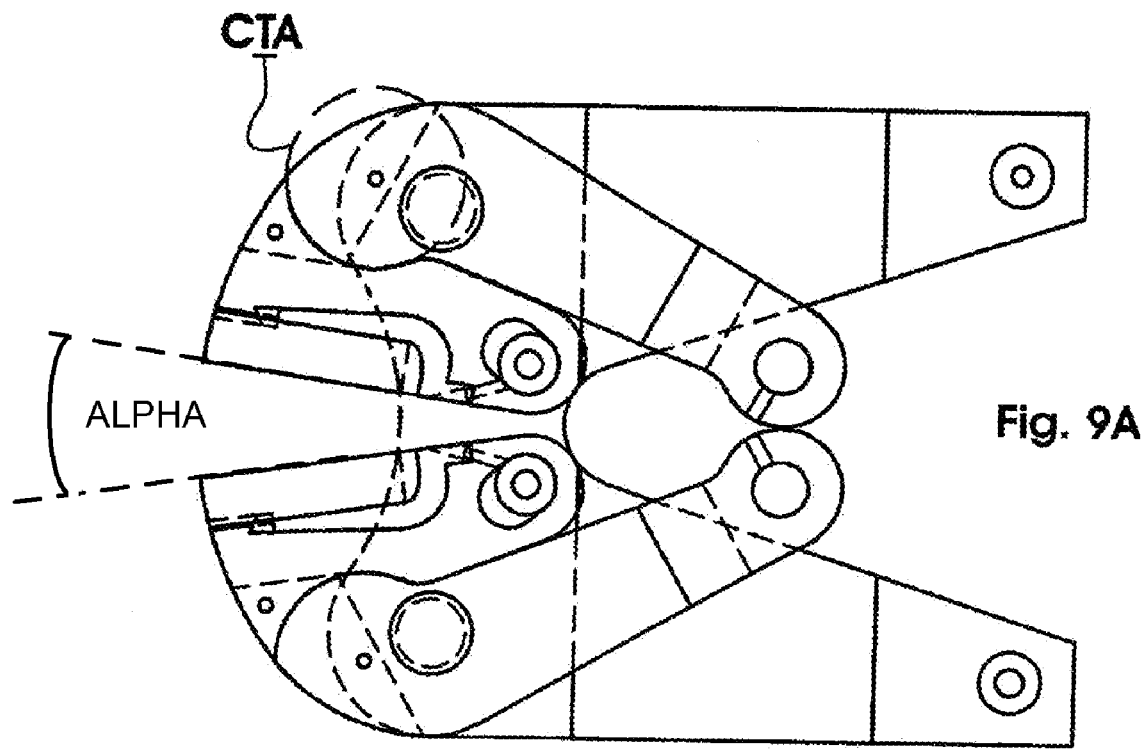
FIGS. 9A and 9B show plan schematic views of the two-stage attachment of the present invention in "open" and a "closed" positions.
Figure 9B:
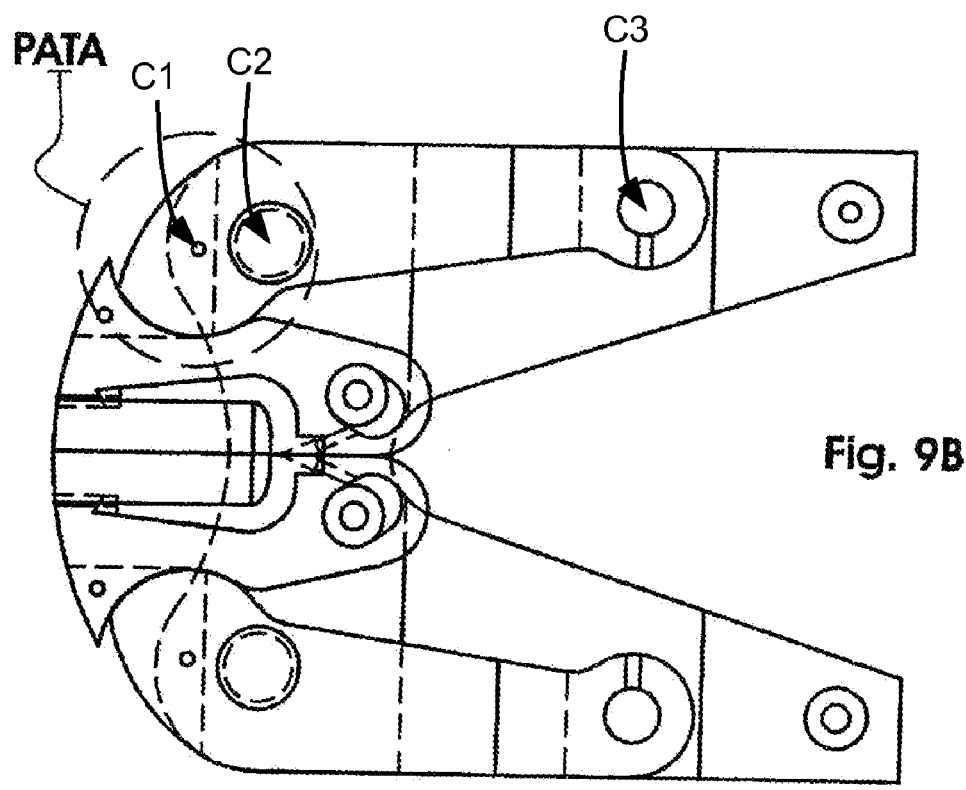
Figure 9C:
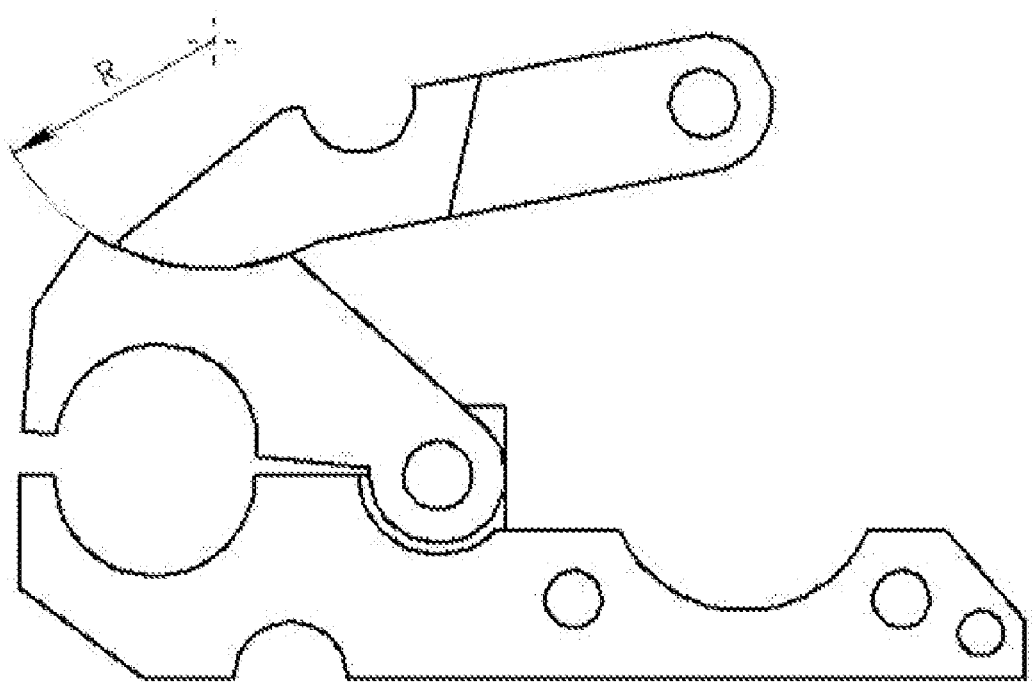
FIG. 9C shows an example of a plan view where the center of curvature of the cam surface is outside the cam.

Blade supports 22a, 22b include arcuate concave working surfaces, or yielding surfaces 22aX, 22bX. Yielding surfaces 22aX, 22bX are located adjacent to and in sliding contact with pushing surfaces 15aX, 15bX of the cams 15a, 15b. Pushing and yielding surfaces of each cam and blade support coupling (15aX/22aX, 15bX/22bX) form arcs of imaginary concentric circles, whose centers lie at a pre-calculated distance from an axis of master pivots 17a, 17b, respectively, as shown in FIGS. 9A and 9B.

Blade supports 22a, 22b are pivoted by blade support pivot shafts, or slave pivots 23a, 23b. Oval-shaped slave pivot apertures, or apertures 24a, 24b, are included in blade supports 22a, 22b, shown in FIG. 14A. Slave pivots 23a, 23b protrude through their corresponding apertures 24a, 24b, so that blade supports 22a, 22b can rotate, as well as move linearly (restricted by a length of apertures 24a, 24b) about their slave pivots 23a, 23b. Slave pivots 23a, 23b are hollow, and their length exceeds the thickness of blade supports 22a, 22b by a distance equaling approximately one half of the thickness of blade supports 22a, 22b. Slave pivots 23a, 23b may also be made with a smaller outside diameter and supplemented by roller rings, or bearings (not shown), for the purpose of wear reduction.

Master pin orifices 25a, 25b are drilled precisely through centers of the above-mentioned imaginary concentric circles. Slave pin orifices 26a, 26b are drilled through sides of blade supports 22a, 22b. Cam slots 27a, 27b and blade support slots 28a, 28b are machined (or otherwise formed) thereafter and master pins 29a, 29b and slave pins 29aa, 29bb are then gently hammered into corresponding orifices in order to accommodate linking springs 30a, 30b. The springs 30a, 30b are clipped onto pins 29a, 29aa, 29b, 29bb. As a result, contact between cam 15a and blade support 22a and between cam 15b and blade support 22b is thereby maintained, as shown in FIGS. 9A–9B.

Further, blade supports 22a, 22b include supporting surfaces, or blade beds 22aY, 22bY, respectively, for exchangeable blades. Blade beds 22aY, 22bY are machined (or otherwise formed) in such manner that when the two-stage attachment of the present invention is in an "open" position, the straight flat portions of blade beds 22aY, 22bY are substantially parallel to each other (shown, for purposes of illustration, in FIG. 9A). An importance of this factor is explained below, with reference to operation of the preferred embodiment. Blade beds 22aY, 22bY also have keyed retaining ledges 31a, 31b, and threaded holes 32a, 32b.

All exchangeable blades, namely crushing blades 34a, 34b, shearing blades 35a, 35b, crimping blades 36a, 36b, perforating blades 37a, 37b and labeling blades 38a, 38b (shown in FIGS. 14B–14F, respectively) are machined so that their mounting surfaces (34aY, 34bY, 35aY, 35bY, 36aY, 36bY, 37aY, 37bY, 38aY and 38bY, respectively) fit precisely onto blade beds 22aY, 22bY, while grooved retaining shelves 33a, 33b fit snugly over and behind keyed retaining ledges 31a, 31b. All blades have a fastening hole FH at their rear ends, through which mounting screws 39a, 39b fasten them to blade supports 22a, 22b, as shown in FIG. 7.

Exchangeable blades can also include concentric perforating blades (for making O-ring gaskets and washers), grommeting blades, flaring blades (not shown), etc. There is no need to disassemble the tool for changing one set of blades to another. Mounting screws 39a, 39b are easily accessible while two-stage attachment is in an "open" position.

Figure 8:
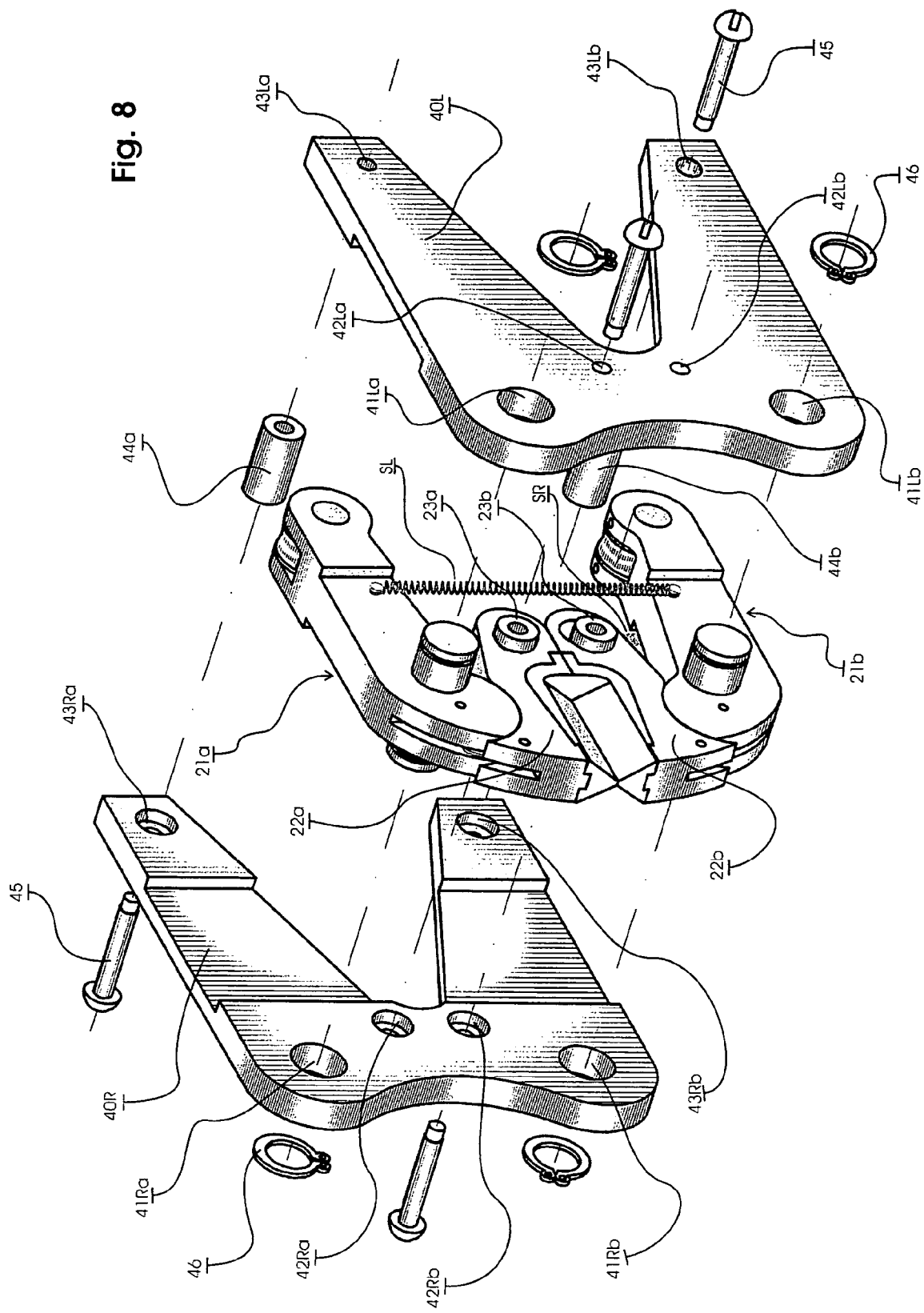
FIG. 8 shows a partially exploded isometric view of the preferred embodiment of the two-stage attachment, where movable members are shown as if they were actually assembled, in a "closed" position.

The preferred embodiment of the two-stage attachment further includes two cheeks, side plates, or fulcrum plates 40R, 40L, as shown in FIG. 8. Each fulcrum plate 40R, 40L featuring two master pivot holes 41a, 41b (41Ra, 41Rb, 41La, 41Lb), two slave pivot wells 42a, 42b (42Ra and 42Rb, 42La and 42Lb) and two mounting shaft wells 43a, 43b (43Ra and 43Rb, 43La and 43Lb). The master pivot holes 41a, 41b, slave pivot wells 42a, 42b and mounting shaft wells 43a, 43b are located equidistant from longitudinal axis of symmetry of each fulcrum plate.

Master pivot holes 41Ra, 41La, 41Rb, 41Lb maintain a constant diameter throughout an entire thickness of fulcrum plates 40R, 40L, and walls of these holes are smooth. On the other hand, slave pivot wells 42Ra, 42La, 42Rb, 42Lb and mounting shaft wells 43Ra, 43La, 43Ra, 43Rb have non-constant diameters and threads, as explained below. Mounting shafts 44a, 44b are dimensionally and physically identical to slave pivots 23a, 23b and interchangeable with them.

Fulcrum plates 40R, 40L are positioned parallel and next to each other as if they were one another's mirror reflections, except that each threaded well is opposed by its corresponding smooth-walled well. The parts are assembled into a sandwich-like structure that is capable of disassembly, in such order that master pivot holes 41Ra, 41La accommodate master pivot 17a (41Ra/17Ra, 41La/17La) of cam lever 21a and master pivot holes 41Rb, 41Lb accommodate master pivot 17b (41Rb/17Rb, 41Lb/17Lb) of cam lever 21b. Similarly, slave pivot wells 42Ra, 42La accommodate slave pivot 24a of blade support 22a and slave pivot wells 42Rb, 42Lb accommodate slave pivot 24b of blade support 22b. In addition, mounting shaft wells 43Ra, 43La accommodate mounting shaft 44a and mounting shaft wells 43Rb, 43Lb accommodate mounting shaft 44b. Ends of positioning springs SR, SL (only spring SL is shown) are hooked to spring holders 16H.

The portions of slave pivots 24a, 24b extending beyond the sides of blade supports 22a, 22b are received by slave pivot wells 42Ra, 42La, 42Rb, 42Lb. In exactly the same manner, the length of mounting shafts 44a, 44b that exceeds the thickness of blade supports 22a, 22b is received by mounting shaft wells 43Ra, 43La, 43Rb, 43Lb. Narrow portions of slave pivot wells 42Ra, 42Lb, and mounting shaft wells 43La, 43Rb are threaded, and narrow portions of pivot wells 42Rb, 42La, and mounting shaft wells 43Ra, 43Lb are smooth so that fasteners 45 can be inserted from outer sides of fulcrum plates 40R, 40L and then tightened.

A depth of the large diameter portions of slave pivot wells 42Ra, 42La, 42Rb, 42Lb and of mounting shaft wells 43Ra, 43La, 43Rb, 43Lb is calculated such that when fasteners 45 are tightened securely, a play of approximately 0.02–0.03 mm remains between inner walls of fulcrum plates 40R, 40L and the cam levers 21a, 21b and blade supports 22a, 22b, to allow for their friction-free movement. Additional strength is given to the assembly by retaining rings 46.

Figure 6:
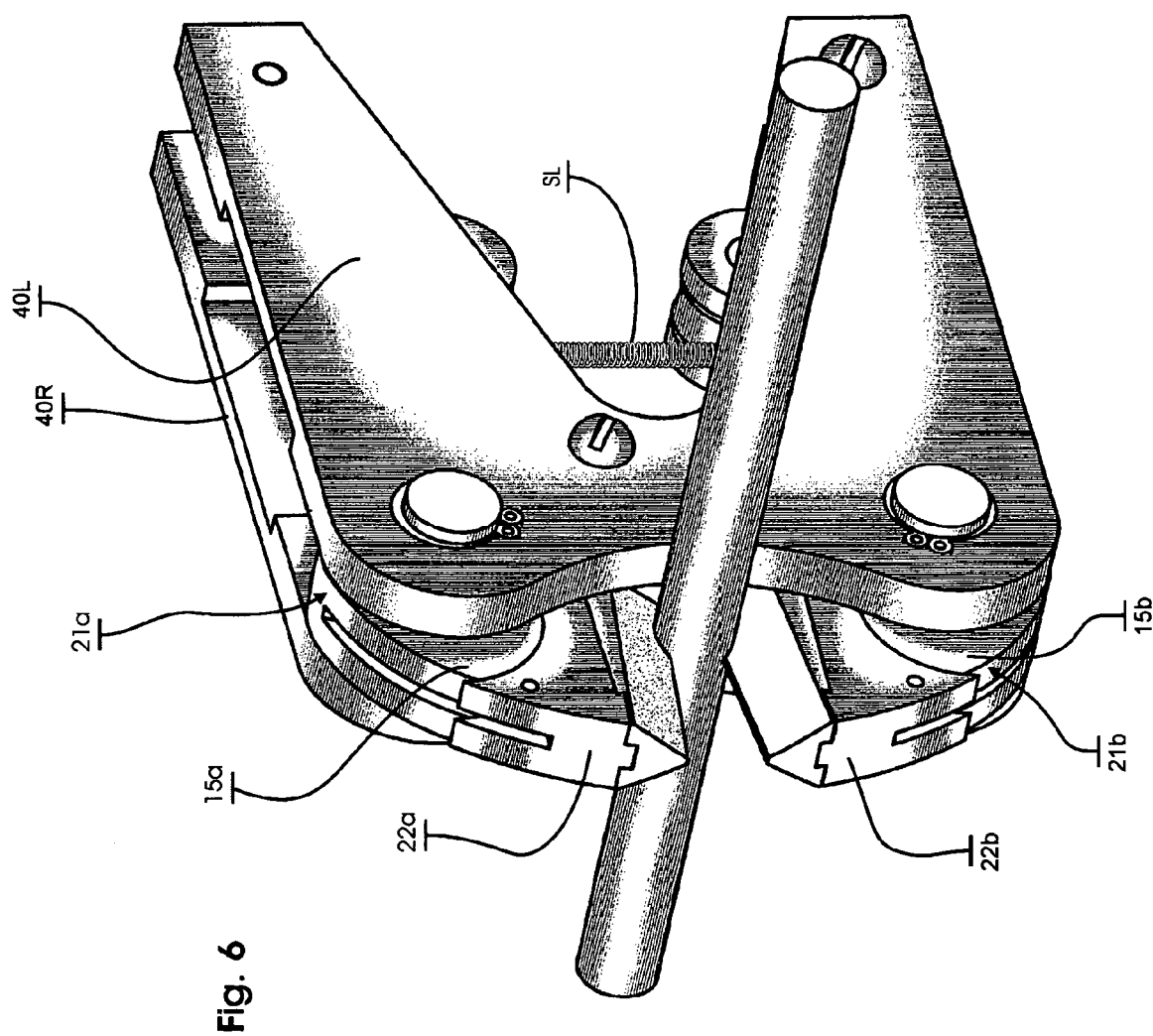
FIG. 6 shows an isometric view of a preferred embodiment of a two-stage attachment of the present invention.

A fully assembled preferred embodiment of the two-stage attachment of the present invention is shown in FIG. 6. If the two-stage attachment is mounted onto pad eyes of a face flange FF of a power mechanism, shown in FIGS. 10A–10B such as that of U.S. Pat. No. 4,760,644, a number of mounting and quick-connecting arrangements can be implemented as would be recognized by a person having ordinary skill in the relevant art.

In one embodiment, all the parts described above (except shearing blades 35a, 35b, perforating blades 37a, 37b and labeling blades 38a, 38b) are identical to their counterparts and therefore interchangeable. In other words, there is no difference between the parts described as "upper" and "lower" or "right" and "left". In addition, the suffixes "a", "b", "R" and "L" are used merely for clarity, except in those cases that are listed above in parenthesis with respect to the blades. As can be seen in the figures corresponding to shearing blades, perforating blades and labeling blades, i.e., FIGS. 14C, 14E, 14F, 14H, 14J, 14K, the nature of the respective operation results in the upper and lower parts not being interchangeable.

OPERATION OF THE PREFERRED EMBODIMENT

Figure 10A:
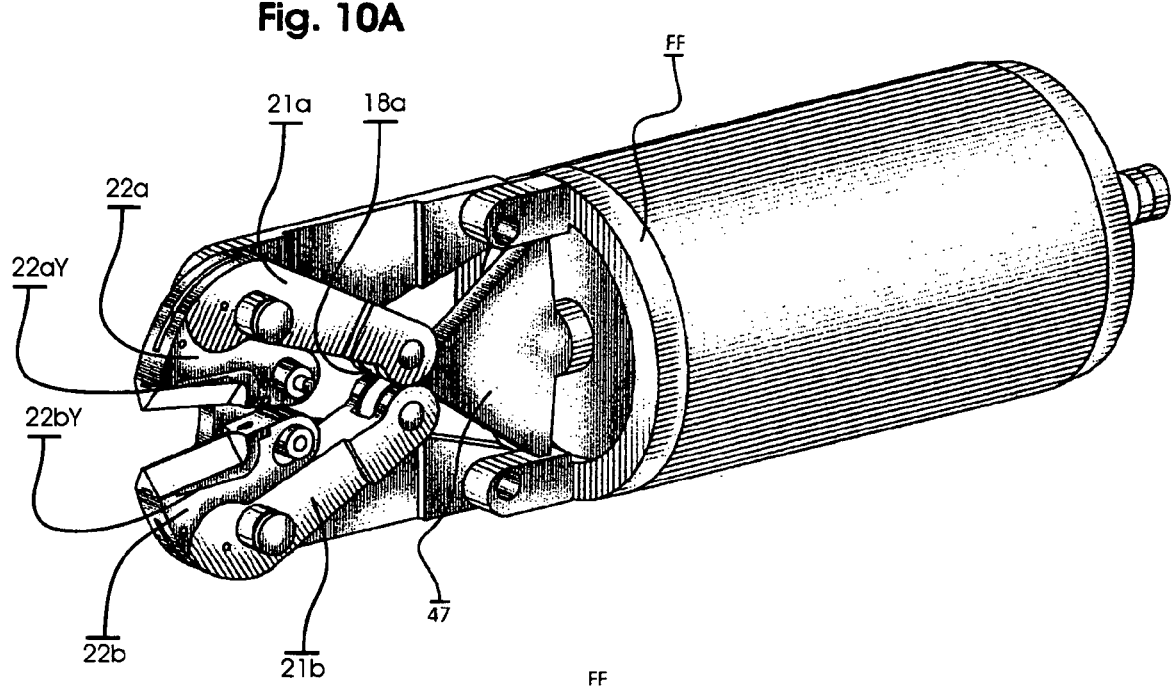
FIGS. 10A and 10B show isometric views of "open" and "closed" positions (one fulcrum plate is removed so that the other components may be easily viewed) of the preferred embodiment, being attached to a hydraulic power source.

A normal, operation-ready position of the preferred embodiment of the two-stage attachment is "open", shown in FIG. 10A. Actuating cam 47 is fully retracted and touching the rollers 18a, 18b at its tip. In such a configuration, positioning springs SL, SR (not shown) are under minimal tension, sufficing merely for preventing loose movements.

Cam levers 21, blade supports 22a, 22b and exchangeable blades of any of above described sets are at a maximum angle with respect to each other in the "open" position. Blade beds 22aY, 22bY, to the contrary, are substantially parallel to each other as well as to the theoretical longitudinal axis of the two-stage attachment, as shown in FIG. 9A. This feature is further explained below. Yielding surfaces 22aX, 22bX are kept in contact with pushing surfaces 15aX, 15bX by linking springs 30a, 30b. Slave pivots 23a, 23b are at lower ends of apertures 24a, 24b.

The two-stage method of the present invention allows for the angle between open blades to range from 14 to 16 degrees (see angle of travel ALPHA in FIG. 9A) (against 22 to 24 degrees of most conventional devices), regardless of a size of the attachment. This eliminates the uncontrollable "slipping" of a material that one attempts to cut further away from pivots of blades of typical conventional cutters. Such a well-known and irritating effect causes a point of applied force to move as well, thus necessitating an unreasonably large force for making a cut plus substantially increasing structural tensions within conventional tools. Also, a larger angle between open blades complicates, for instant, implementation of perforating or grommeting blades.

As linear force is imparted to actuating cam 47, the cam 47 engages rollers 18a, 18b. Cam levers 21a, 21b thus receive a force that urges them to rotate around master pivots 17a, 17b, increasing tension of positioning springs SL, SR. As a result, a counter-directed force naturally is placed on cams 15a, 15b. Centers of the aforementioned imaginary concentric circles geometrically, and therefore physically, coincide with points from which these forces are projected. Cams 15a, 15b push blade supports 22a, 22b, the latter consequently move towards a "closed" position, and the blades cut, squeeze or otherwise deform the work piece.

These movements result from a "pushing and sliding" action occurring between pushing surfaces 15aX, 15bX and yielding surfaces 22aX, 22bX, and, also, from slave pivots 23a, 23b movement within apertures 24a, 24b to maintain a functional attitude of blade supports. Blade supports 22a, 22b therefore not only move towards each other, but are also being somewhat dragged, or retracted, into the attachment. During a design process, a distance of this travel can be increased or decreased by a positioning of above described pairs of imaginary concentric circumferences closer to or further away from each other.

A beneficial effect of this linear movement is that, providing the thickness of a work piece (in this case, a medium hard steel bolt, rod or bar intended to be cut in the crushing mode) does not exceed a recommended maximum for a given size of the two-stage attachment, this work piece, upon being inserted between opened blades, will touch not only cutting edges of the blades but also frontal edges of fulcrum plates 40R, 40L (shown in FIG. 9A). Therefore, at the very beginning of a cut, an advantage of this horizontal inward movement of blade supports 22a, 22b is that as the blades move, they are not only squeezing the work piece, but generating a sawing effect as well.

Most conventional cutters allow for such an effect to take place only when the work piece is about twice as small as a thickness of their advertised capacity. One skilled in the art can appreciate the following fact: the two-stage attachment of the present invention, designed for cutting maximum of 10 mm diameter of steel bolt and made of average quality steel, is of the same width, smaller overall thickness and notably smaller length than a store-purchased bolt cutter of advertised 10 mm maximum, yet meets the above outlined criteria.

When the two-stage attachment is used, for instance, in its perforating mode, the inward movement of blades is too long, which reduces a range of widths of a field between an edge of sheet metal and a row of holes punched in it. It is therefore advisable to keep such a distance at a reasonable "golden mean" of approximately ⅓ of a recommended maximum thickness of work piece, as explained above.

Another advantage of the two-stage method is a superiority of its available lever ratio over most conventional devices. Typical store-purchased bolt cutters have this ratio ranging approximately from 2.7 to 3.5, depending on size and thickness of the work piece. The two-stage attachment described herein, for 10 mm capacity, cuts a 10 mm bolt at a lever ratio of approximately 5.2, thereby significantly reducing the force needed for its operation. This is especially important for a manually operated version of the two-stage attachment described below.

Figure 10B:
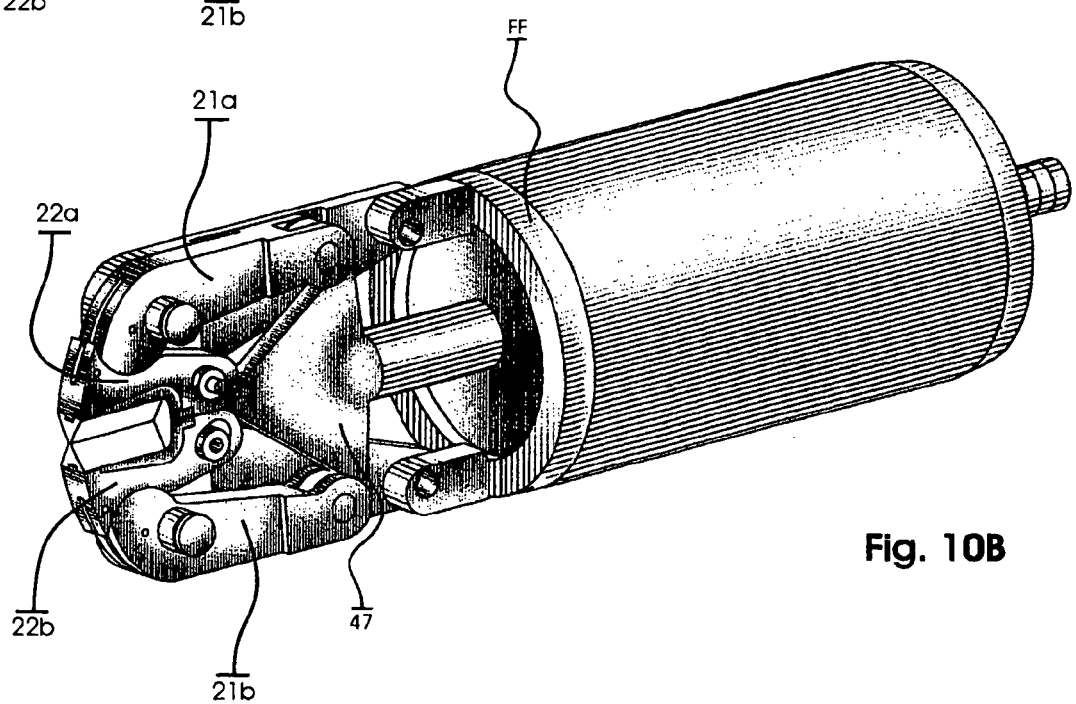

FIG. 10B shows a "closed" position of the two-stage attachment. Actuating cam 47 is fully extended, rollers 18a, 18b are at furthermost points from its tip. Positioning springs SL, SR are under maximum tension and cam levers 21a, 21b are mutually parallel. So are blade supports 22a, 22b, but not blade beds 22aY, 22bY. These are at this point at their maximum angle to each other (shown in FIG. 9B). It is yet another advantage of the two-stage attachment that, at the very start of the movement of blade supports 22a, 22b towards each other, blade beds 22aY, 22bY are "locking" the blades inward. This optimizes a distribution of structural tensions, while avoiding a need for strong fasteners between blade and blade support. Slave pivots 23a, 23b are at higher ends of apertures 24a, 24b.

As linear force on actuating cam 47 ceases to exist, and the cam 47 starts retracting, a reverse of the above process begins. Positioning springs SL, SR return cam levers 21a, 21b into "open" position, and linking springs 30a, 30b maintain yielding surfaces 22aX, 22bX in full contact with pushing surfaces 15aX, 15bX. Upon complete retraction of actuating cam 47, the two-stage attachment is again in the "open" position.

ALTERNATIVE EMBODIMENT

In the preferred embodiment of the two-stage attachment, angles of "upper" and "lower" halves relative to each other are, at any given moment, maintained by actuating cam 47, thus allowing an advantage of employing short, independently pivoted blade supports 22a, 22b to be taken. However, this need not be the case in a manually operated version of the invention. Here, blade supports must be mutually linked, since it shall otherwise result in uncontrollable play, which is inevitable whenever four or more pivot points are movably connected into an enclosed series.

Figure 12:
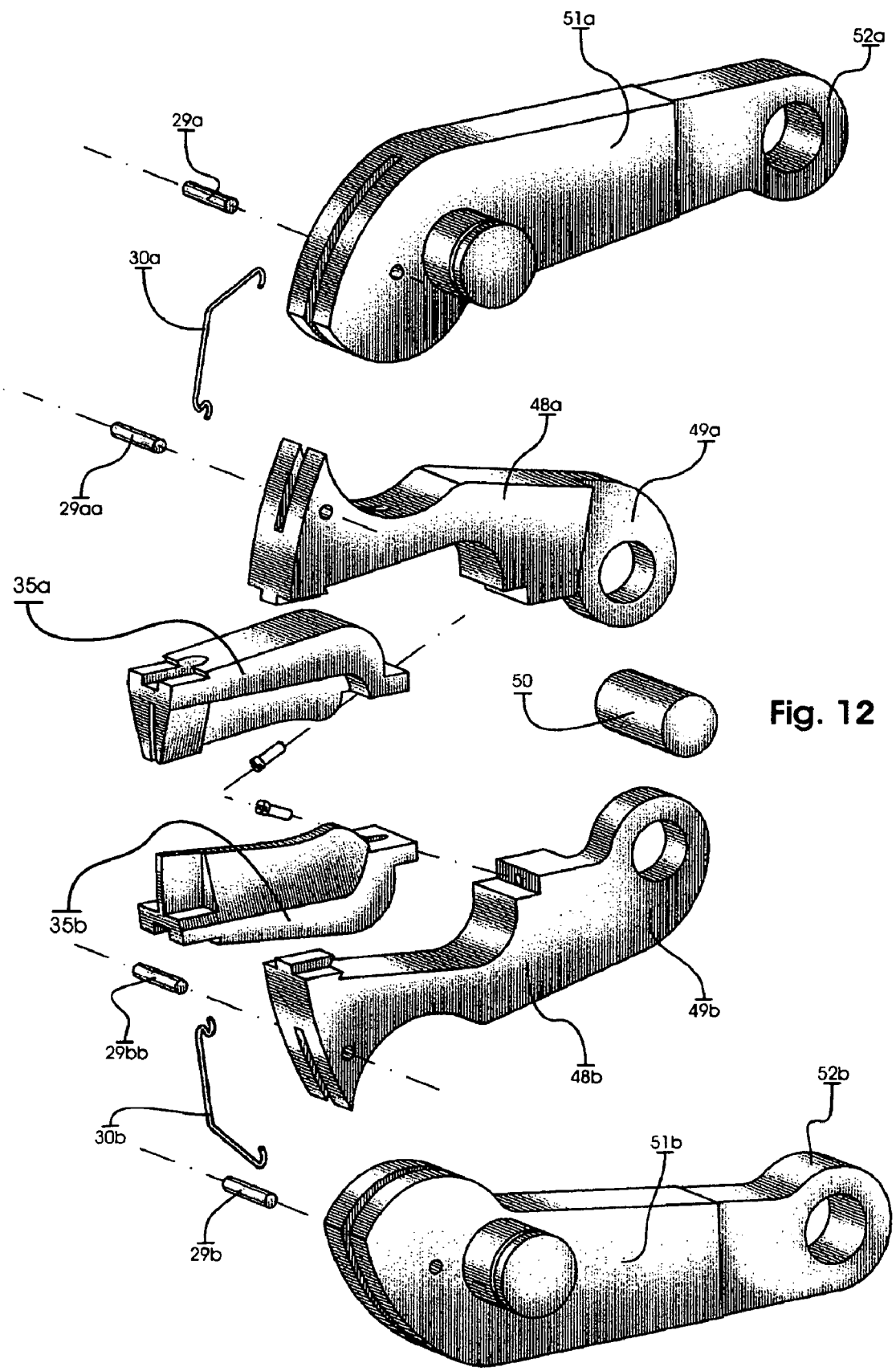
FIG. 12 shows an exploded isometric views of movable members of a manually operated version of the two-stage attachment.
Figure 14G:
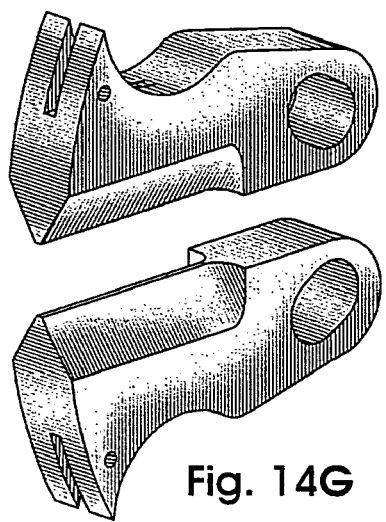
FIGS. 14G to 14K show, in the same order as above, sets of blades where each is made as a single piece with blade support, for use in small sizes of the two-stage attachment.
Figure 14H:
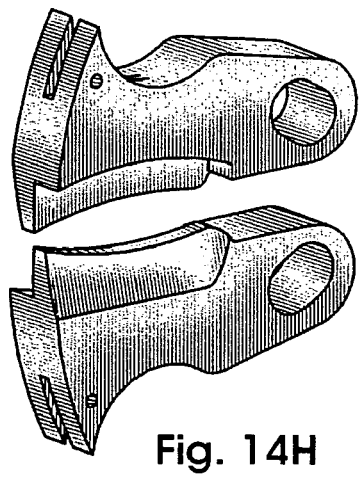
Figure 14J:
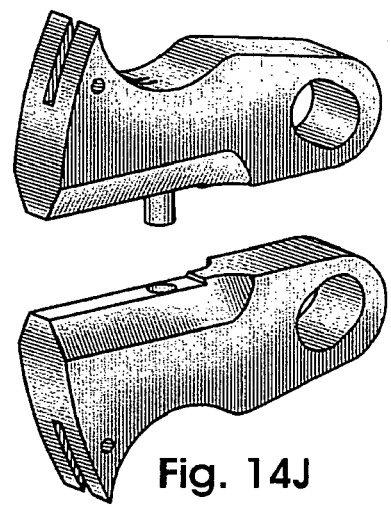
Figure 14I:
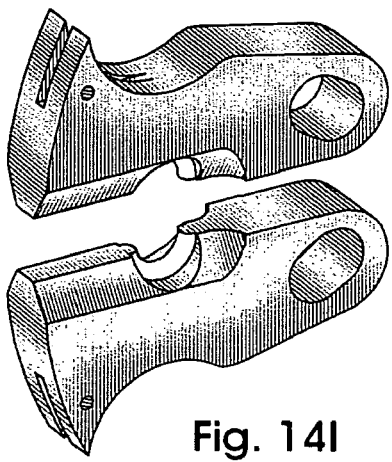
Figure 14K:
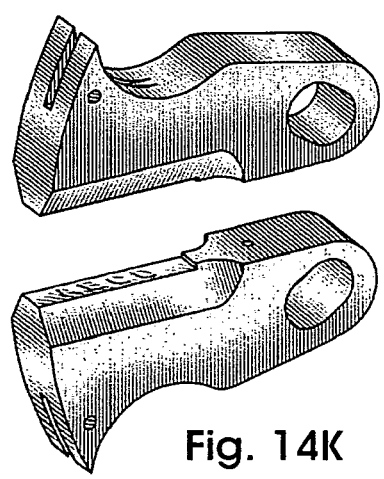

Consequently, jointly pivoted blade supports 48a, 48b are introduced as shown in FIG. 12, which shows, from top to bottom: upper manual cam lever 51a, upper pared blade support 48a, upper exchangeable blade 35a, common slave pivot 50, lower exchangeable blade 35b (shearing blades shown), lower pared blade support 48b and lower manual cam lever 51b. The pivot ends of the pivoted blade supports 48a, 48b are longer than those of individually pivoted blade supports 22a and 22b because otherwise the advantage of the small angle between opened blades will be lost. Each includes a single, horizontally offset pad eye 49a, 49b of half the thickness of the blade support. Common slave pivot 50 has a simple cylindrical shape, and its length exceeds the thickness of either of blade supports 48a, 48b by a distance approximately equal to ½ the thickness. In other features, jointly pivoted blade supports 48a, 48b are generally similar to blade supports 22a, 22b.

Manually actuated cam levers 51a, 51b differ from cam levers 21a, 21b in practically the same manner as jointly pivoted blade supports 48a, 48b from blade supports 22a, 22b, except single pad eyes 52a, 52b are not offset, and the thickness of the latter is subject to a rather flexible determination.

Lesser fulcrum plates 53R, 53L, of a heart-like shape (shown in FIG. 13), also resemble fulcrum plates 40R, 40L, but instead of slave pivot wells 42Ra, 42Rb, they have pivot grooves 54R, 54L. Immediately neighboring these grooves, at very tips of the "heart", are fastener holes 55R, 55L.

When the manual version of the two-stage attachment is assembled, common slave pivot 50 is movably connecting offset pad eyes 49a, 49b together. The excessive length of common slave pivot 50 is compensated by pivot grooves 54R, 54L, so that unobstructed linear movement of the former within the latter is possible.

Figure 11A:
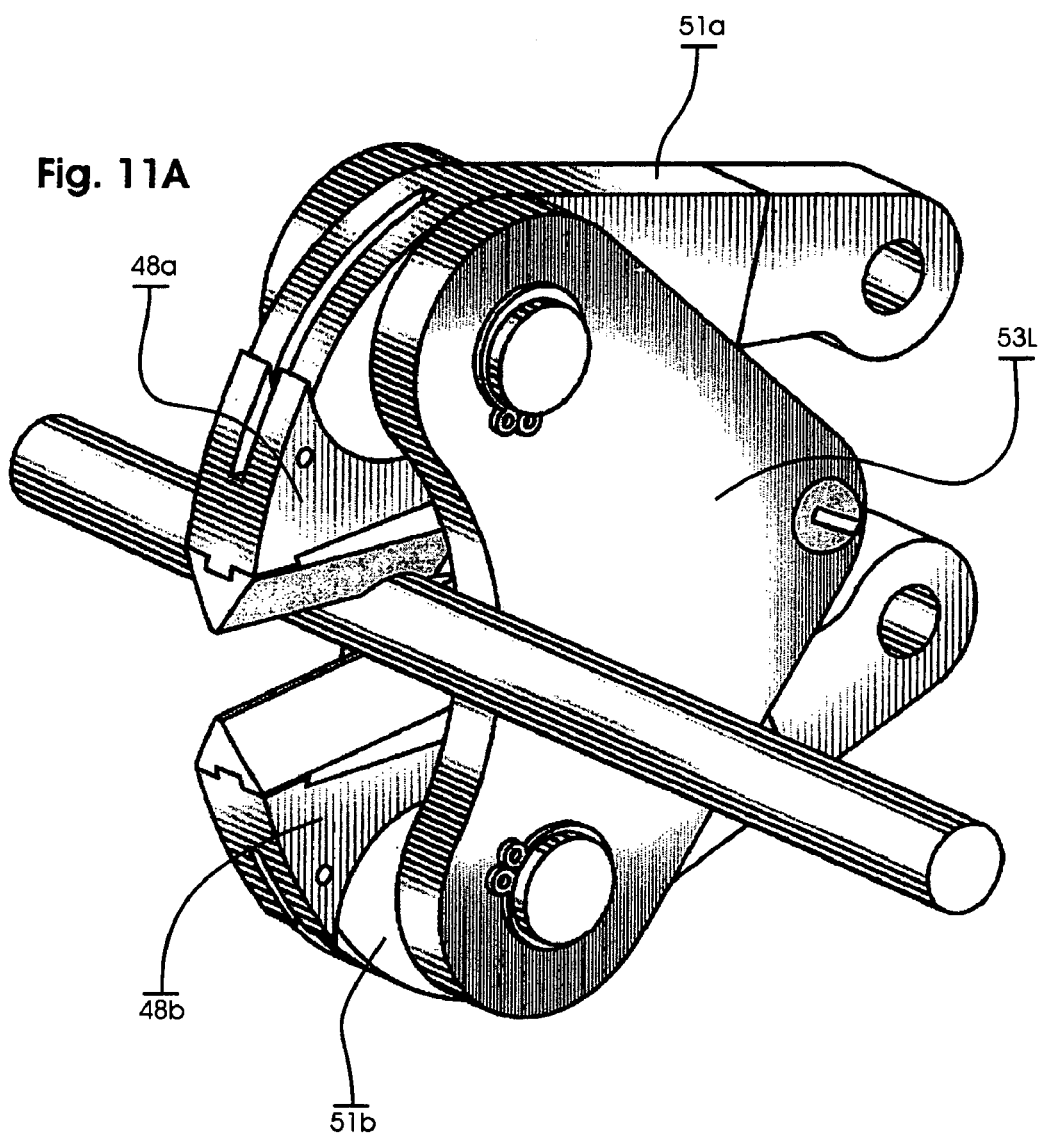
FIGS. 11A and 11B show a functional view of a manually operated version of the two-stage attachment of the present invention and a plan view of the same being attached to handles of a widely used conventional bolt cutter, in a "partially open" position.
Figure 11B:
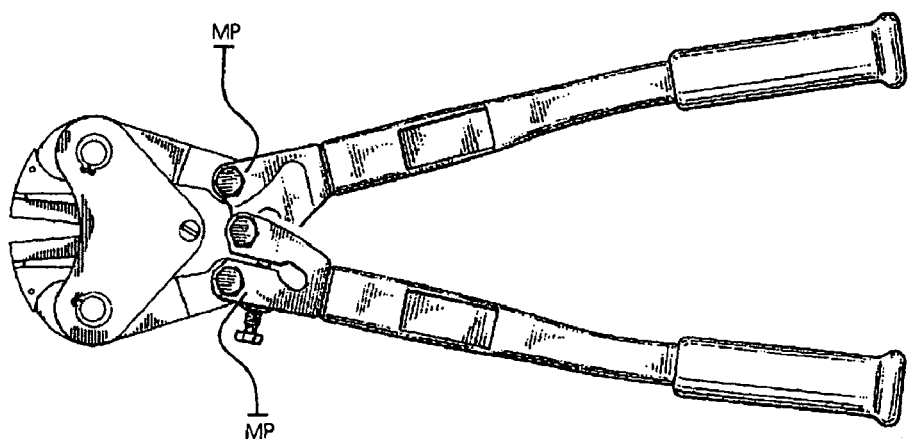

A threaded spacer 56 is placed between fastener holes 55R, 55L. Short fasteners 57 are then inserted and tightened securely, and retaining rings 46 installed. Single pad eyes 52a, 52b are mounted onto either store-purchased or custom-made handles, and the tool is ready to function in the mode defined by whatever set of blades is installed. An exemplary fully assembled manually operated two-stage attachment of the present invention is shown in FIGS. 11A–11B.

Each blade support and blade may be constructed as one piece, as shown in FIGS. 14G–14K. Exchangeability still remains, but the two-stage attachment must be disassembled in order to replace such combined blades. Still, within minutes, one mode of operation can be swapped to another.

It shall be left to the discretion of each individual manufacturer to decide, depending upon their marketing goals, and available materials and technologies, how many sizes of the two-stage attachments it deems expedient to make, and which of these sizes are feasible to be made with exchangeable blades versus employing blade support and blade as one piece.

It is, however, helpful to consider the following: assuming an average hardened steel alloy as being a material of choice, and the lever ratio of 5.1–5.2 is not to be sacrificed, the use of two-stage method of the present invention permits one skilled in the art to design a tool capable of cutting steel bolt of over 16 mm in diameter and ready for use with handles of conventional store-purchased bolt cutter of ½ inch (12.7 mm) advertised capacity, while having smaller overall dimensions than the conventional tool.

A two-stage attachment made within these dimensions in a power-driven version can cut bolts over 18 mm thick. The sole factor responsible for the difference between capacities of manual and power-driven versions is the width of mounting pad eyes of handles of store-purchased cutters. If the two-stage attachment and its handles are made by the same manufacturer, such a difference normally shall not exist.

Higher quality steel alloys, titanium alloys and composite materials, present a far broader range of size/capacity ratios, putting a target of cutting a 1 inch bolt or rebar with hand-held tool within a comparatively effortless reach.

MODIFICATIONS AND ALTERNATIVE EMBODIMENTS

Numerous changes and improvements can be made without a departure from scope and spirit of the present invention.

In an embodiment, if the size of the two-stage attachment is not important, or a high tensile strength material is chosen, then instead of right (17R) and left (17L) shafts each of master pivots 17*a*, 17*b* simply has a single shaft that protrudes through holes in cam levers 21*a*, 21*b*.

In another embodiment, retaining rings 46 may be substituted by pivot caps screwed into accordingly shortened master pivot shafts 17R*a* to 17L*b*, in order to further reduce overall thickness of the two-stage attachment.

In another embodiment, in order to further improve safety and enhance aesthetic appearance of the manually operated version, it may be so designed that when not in use and in a "closed" position, there are no sharp "fang-like" portions of blade supports 48*a*, 48*b* projecting out.

In another embodiment, positioning springs SL, SR can assume another shape (or can be eliminated altogether) should actuating cam 47 incorporate guide rails for rollers 18*a*, 18*b*).

In another embodiment, rollers 18*a*, 18*b* can be replaced with smaller sliding cams, thus allowing to reduce the width of the two-stage attachment while keeping (and even increasing) its capacity.

In another embodiment, tail ends of fulcrum plates 40R, 40L can have aligning rails to ensure play-free movement of actuating cam 47, or such rails can be arranged on face flange FF.

In another embodiment, roller-engaging edges of actuating cam 47 can be convex from tip to outer corners, so that upon actuating cam's 47 advance, the two-stage attachment closes faster (with smaller force) at the start, and slower (with greater force) at the end. Alternatively, these edges can be wavy and the blades can "pulsate" while closing.

In another embodiment, cam slots 27*a*, 27*b*, blade support slots 28*a*, 28*b* and linking springs 30*a*, 30*b* are unnecessary if there are spring arrangements constantly urging blade supports 22*a*, 22*b* (or jointly pivoted blade supports 48*a*, 48*b*) into the "open" position, regardless of the position of cams 15*a*, 15*b*.

In another embodiment, triple-layer blade supports can enclose thinner cam levers within two outer layers (each about 1.0–1.5 mm thick), thus eliminating need for slave pins 29*aa*, 29*bb*.

In another embodiment, jointly pivoted blade supports 48*a*, 48*b* each can have more than one offset pad eye 49*a*, 49*b* so that they are pivotally connected in an interlocking manner.

In another embodiment, instead of round holes, pad eyes 49*a*, 49*b* can include apertures of the same kind as those of blade supports 22*a*, 22*b*, while pivot grooves 54R, 54L of lesser fulcrum plates 53R, 53L are replaced by round wells (like that of fulcrum plates 40R, 40L), In another embodiment, there may be one fulcrum plate carrying a double-layer cam lever/blade support coupling on both sides of the fulcrum plate.

The present invention can also be used in a stationary, as opposed to a hand-held or portable, implement of a much larger size and capacity. A bench-mounted frame carries out the function of fulcrum plate of the two-stage attachment and only one cam lever, blade support and blade will be sufficient. A big single handle must then be pivoted within the same frame in the way similar to the common slave pivot 50 and pivot grooves 54R, 54L arrangement of the manual version.

Another possible embodiment has three or more cam lever and blade support couplings enclosed into a torus-shaped, or a doughnut-shaped fulcrum ring. A tool like this can be used for precision crimping in various situations where stationary equipment is not an option. Torus-like fulcrum ring can just as well accommodate cam lever and blade support couplings turned "inside out" as to create, instead of squeezing, an expanding effect.

The present invention provides a way of achieving more efficient utilization of the physical principle of the lever. Some comparisons to conventional art are necessary for better illustration.

From "open" to "closed" positions of a conventional bolt cutter, its mounting pad eyes MP (shown in FIG. 11*b*) travel a certain distance along an arc determined by a radius between their centers and the pivot point and, also, by their outer diameter. For the purposes of this explanation, these shall be considered constant.

Another important radius is from a pivot center of typical blade of such cutter to a center of this blade's own mounting pad eye. The longer it is, the narrower the angle of blade's movement, and, consequently, the available range of capacities versus size of the tool.

On the other hand, the aforementioned radius' being shorter results in an undesirably large angle between cutting edges of opened blades and a reduction of the tool's overall lever ratio.

The tool described herein, effectively, splits a single blade into two independently pivoted members. Significantly shorter (thinner, narrower and lighter) cam levers 21*a*, 21*b* enjoy far greater sectors of travel around pivots 17 then do single blades mounted to the same set of handles. The difference, if one wishes, is made at the area of contact between cams 15*a*, 15*b* and blade supports 22*a*, 22*b* where, due to the very nature of rotationally slidable joints, the ability to eliminate above sited faults of a single blade (by establishing most favorable opening angles) is achieved, and practically no dimensional sacrifices are necessary.

As shown in FIG. 9A by a dashed circumference CTA, cams 15a, 15b do not even fully occupy their own theoretical area. Depending on the material of which the tool is constructed, such an area (and therefore overall width of the tool) can be reduced yet further with no loss of lever ratio or capacity. As a result, it creates additional resource for the width of blades so they, being expendable anyway, can be made of cheaper material.

Dashed circumference PATA of FIG. 9B shows a theoretical area of eccentrically pivoted boss of a conventional tool, such as the tool shown in FIGS. 2A–2C, of adequate lever ratio, which also commands additional area for its enclosure. It is quite evident that, within these dimensions, such a boss barely leaves enough room for sufficiently rigid blades of the types shown in FIGS. 14G–14K and much less for those of FIGS. 14B–14F. This illustration demonstrates the interdependent nature of seemingly separate aspects of the two-stage method.

The two-stage method permits for cams 15a, 15b traveling through narrower sector than that of a circular boss, and for most effective positioning of this sector depending on each particular application. Note that in FIG. 9B, the distance between the center of curvature of the surface of the cam 15a (labeled C1) and the center C2 of the master pivot is smaller than the distance between the center C2 of the master pivot and the point C3 at which force is applied to the cam 15a. Note also that in this embodiment, C1 and C2 do not coincide. Note also that in the alternative example of FIG. 9C, the center of curvature of the surface of the cam 15a is outside the cam (see cam surface radius indicated by "R").

Having thus described preferred embodiments, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A two-stage attachment, comprising:
   a plate;
   a first cam lever pivotally connected to the plate by a first master pivot and including a first convex arcuate cam surface;
   a first working member including a first concave arcuate surface and a first working surface, wherein the first convex arcuate surface is in sliding contact with the first concave arcuate surface while the first working member pivots around a first slave pivot, and
   wherein the first cam lever and the first working member are substantially in a common plane;
   a second working member opposite the first working member;
   a second cam lever, opposite the first cam lever, pivotally connected to the plate by a second master pivot and including a second convex arcuate cam surface;
   the second working member including a second concave arcuate cam surface and a second working surface;
   wherein the second convex arcuate cam surface is in sliding contact with the second concave arcuate surface while the second working member pivots around a second slave pivot, and
   wherein the second cam lever and the second working member are in a common plane; and
   a spring coupled to both cam levers and configured to pull the cam levers toward each other.

2. The two-stage attachment of claim 1, wherein the first working member is a blade support, and includes a cutting surface on a side facing away from the first concave arcuate surface.

3. The two-stage attachment of claim 2, wherein the blade support and the cutting surface are constructed as a single piece.

4. The two-stage attachment of claim 2, wherein the first working member includes a blade.

5. The two-stage attachment of claim 4, wherein the blade is removable.

6. The two-stage attachment of claim 1, wherein the first working member includes a crimping surface on a side facing away from the first concave arcuate surface.

7. The two-stage attachment of claim 1, wherein the first working member includes a character imprinting element on a side facing away from the first concave arcuate surface.

8. The two-stage attachment of claim 1, wherein the first working member includes a hole puncher on a side facing away from the first concave arcuate surface.

9. The two-stage attachment of claim 1, wherein the first and second working members are independently pivotally coupled to the plate by respective slave pivots.

10. The two-stage attachment of claim 1, wherein the first and second slave pivots do not coincide.

11. The two-stage attachment of claim 1, wherein an angle of travel of the first and second working surfaces ranges from 14 to 16 degrees.

12. The two-stage attachment of claim 1, wherein a center of curvature of the first arcuate cam surface is outside of the first cam lever.

13. The two-stage attachment of claim 1, wherein the plate is a fulcrum plate.

14. The two-stage attachment of claim 1, wherein a center of curvature of the first convex arcuate cam surface does not coincide with the first master pivot.

15. The two-stage attachment of claim 1, wherein a distance between a center of curvature of the first convex arcuate cam surface and the first master pivot is smaller than a distance between the master pivot and a point at which force is applied to the first cam lever.

16. The two-stage attachment of claim 1, wherein a center of curvature of the first arcuate cam surface is outside of the first cam lever.

17. A two-stage attachment, comprising:
   a plate;
   a first cam lever pivotally connected to the plate by a first master pivot and including a first convex arcuate cam surface;
   a first working member including a first concave arcuate surface and a first working surface, wherein the first convex arcuate surface is in sliding contact with the first concave arcuate surface while the first working member pivots around a first slave pivot, and
   wherein the first cam lever and the first working member are substantially in a common plane; and
   a second working member opposite the first working member;
   a second cam lever, opposite the first cam lever, pivotally connected to the plate by a second master pivot and including a second convex arcuate cam surface; and
   the second working member including a second concave arcuate cam surface and a second working surface, wherein the second convex arcuate cam surface is in sliding contact with the second concave arcuate surface while the second working member pivots around a second slave pivot, wherein the second cam lever and the second working member are in a common plane, and wherein the first and second slave pivots coincide.

18. A two-stage attachment, comprising:

a plate;

a first cam lever pivotally connected to the plate by a first master pivot and including a first convex arcuate cam surface;

a first working member including a first concave arcuate surface and a first working surface, wherein the first convex arcuate surface is in sliding contact with the first concave arcuate surface while the first working member pivots around a first slave pivot, and wherein the first cam lever and the first working member are substantially in a common plane; and a second working member opposite the first working member, a second cam lever, opposite the first cam lever, pivotally connected to the plate by a second master pivot and including a second convex arcuate cam surface; and the second working member including a second concave arcuate cam surface and a second working surface, wherein the second convex arcuate cam surface is in sliding contact with the second concave arcuate surface while the second working member pivots around a second slave pivot, and wherein the second cam lever and the second working member are in a common plane; and a linking spring coupled to the working members and the respective cam lever configured to maintain contact between the respective cam surfaces.

* * * * *